(12) United States Patent
Aikawa et al.

(10) Patent No.: US 6,671,066 B1
(45) Date of Patent: Dec. 30, 2003

(54) COMPUTER PROGRAM PRODUCT INTENDED FOR PROCESSING PRINT DATA, AND APPARATUS AND METHOD FOR PROCESSING PRINT DATA

(75) Inventors: Masafumi Aikawa, Machida (JP); Tatsuya Kuroda, Yokohama (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/361,706

(22) Filed: Jul. 27, 1999

(30) Foreign Application Priority Data

Jul. 28, 1998 (JP) .......................... 10-212847
Aug. 10, 1998 (JP) .......................... 10-226332

(51) Int. Cl.[7] .............................. G06K 15/00
(52) U.S. Cl. .................... 358/1.18; 358/1.1
(58) Field of Search ................ 358/1.1, 1.13, 358/1.14, 1.15, 1.16, 1.18, 1.17, 400, 401, 402, 444, 404, 443; 399/382, 381, 383

(56) References Cited

U.S. PATENT DOCUMENTS 5,764,863 A    6/1998  Fall et al. ............... 358/1.13
6,075,617 A  * 6/2000  Fischer et al. .......... 358/1.16

FOREIGN PATENT DOCUMENTS

JP    07-064744    3/1995
JP    07-295838   11/1995
JP    09-218762    8/1997

* cited by examiner

*Primary Examiner*—Arthur G. Evans
(74) *Attorney, Agent, or Firm*—Sidley Austin Brown & Wood LLP

(57) ABSTRACT

A program, method and apparatus which are capable of processing print data, in which one job consists of multiple sets of print data with no break, so that features required to processing by the set such as sorting are performed appropriately by a printer. Break codes are added to the print data to indicate breaks between sets and the breaks are identified based on the break codes.

10 Claims, 22 Drawing Sheets

FIG. 5

DETAILED SETTING
FOR PRINT

NUMBER OF SETS
TO PRINT [3] SET/SETS

SELECTION OF PAPER
[A4]

SORT
- ● TO SORT
- ○ NOT TO SORT

STAPLE
- ● TO STAPLE
- ○ NOT TO STAPLE

LAYOUT
- ○ Nin1 EDIT   N=[ ]
- ○ DOUBLE-FACED PRINT
- ● LONGITUDINAL
- ○ LATERAL

IMAGE SIZE [100] %

[CANCEL]   [PRINT EXECUTION]

COMPUTER PROGRAM PRODUCT INTENDED FOR PROCESSING PRINT DATA, AND APPARATUS AND METHOD FOR PROCESSING PRINT DATA

This application is based on applications Nos. 10-212847 and 10-226332 filed in Japan, the contents of which are hereby incorporated by reference.

BACKGROUND OF THE INVENTION

1. Field of the Invention

This invention relates to a computer program product for processing print data, which is stored in storage media and is executable by a computer, a method for processing print data, and an apparatus for processing print data.

2. Description of Related Art

High performance printers developed in recent years have such features as the sorting function for grouping printed pages into multiple sets, the finishing function for stapling these grouped sets of pages, and the Nin1 function for printing two or four pages of contents on one sheet of paper. However, these high performance printers are sometimes unable to take advantage of these advanced features depending on print data they receive. For example, when it is required to make three copies of a set that consists of three pages, i.e., 1-2-3 pages, some of the application software used on personal computers produce and output print data comprising nine pages 1-2-3-1-2-3-1-2-3 in that order as one job of print data. With such a print data without breaks, it is not clear where a set ends. Thus, the high performance printers have no way of applying their sorting or finishing functions.

The problems caused by the print data without breaks defining individual sets also occur in processing the double-faced print or the Nin1 print. For example, if such a set of data consists of odd number pages, e.g., 1-2-3, a high performance printer prints the last page of the first set and the first page of the second set on two sides of a single sheet of paper when the double-faced print is selected, or, on the same side of a single sheet of paper when the 2in1 print is selected.

SUMMARY OF THE INVENTION

An object of the invention is to provide a computer program product, a method and an apparatus for processing print data so that the features such as the double-faced print, the Nin1 print may be processed appropriately.

The present invention with the intention of achieving said object is a computer program product stored on memory media for producing print data executable by a computer comprising: a means of producing print data in which one job comprises one set of print data repeated multiple times; and a means of adding data indicating set break to the produced print data.

The present invention with the intention of achieving said object is a print data processing apparatus comprising: a means of receiving print data in which one job comprises one set of print data repeated multiple times; and a means of adding data indicating set break to the received print data.

The present invention with the intention of achieving said object is a method of processing print data comprising the steps of: a) receiving print data in which one job comprises one set of print data repeated multiple times; and b) adding data indicating set break to the received print data.

BRIEF DESCRIPTION OF THE DRAWINGS

FIG. 5 is a diagram showing the setting screen in print mode;

DETAILED DESCRIPTION OF THE INVENTION

Some of the preferred embodiments of the present invention will be described below referring to the attached drawings.

<<Embodiment 1>>

<System Configuration>

Figure 1:
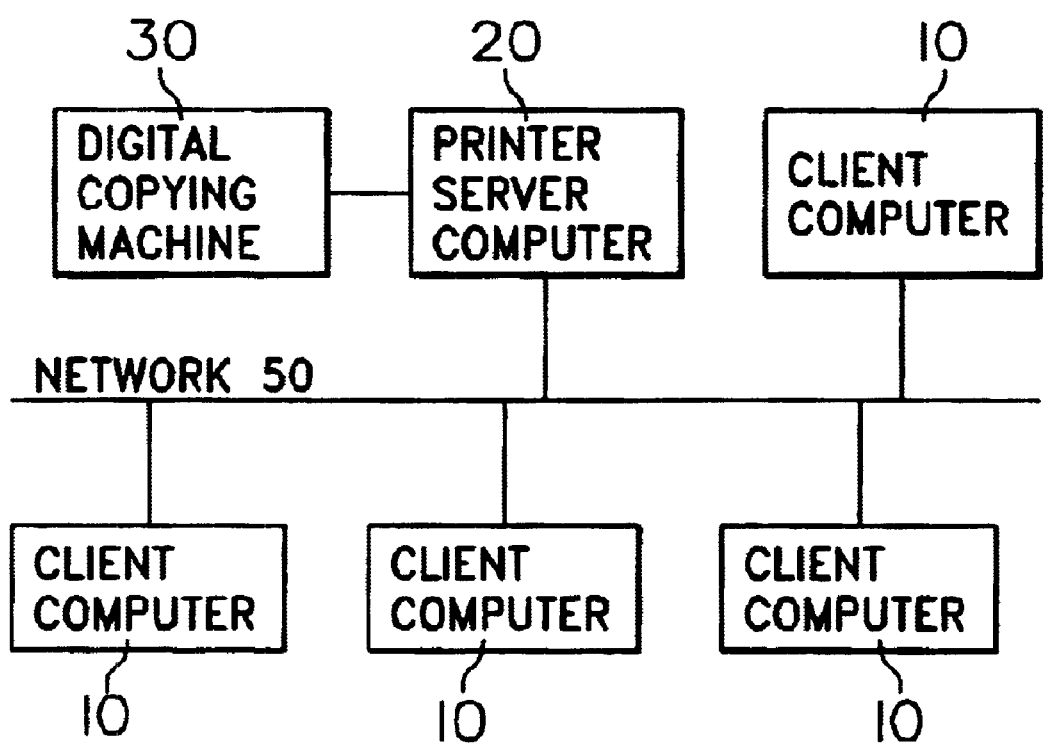
FIG. 1 is a schematic drawing of a network computer system to which the present invention is applied.

The network computer shown in FIG. 1 comprises multiple client computers 10, a printer server computer 20, and a digital copying machine 30 interconnected by a network circuit 50 to form a typical LAN environment.

The digital copying machine 30 is a composite machine provided with, in addition to its function as a copying machine, a function to act as a printer for printing based on instructions from the client computer 10, and another function to act as a facsimile machine connected to the outside telephone circuits (not shown).

Figure 2:
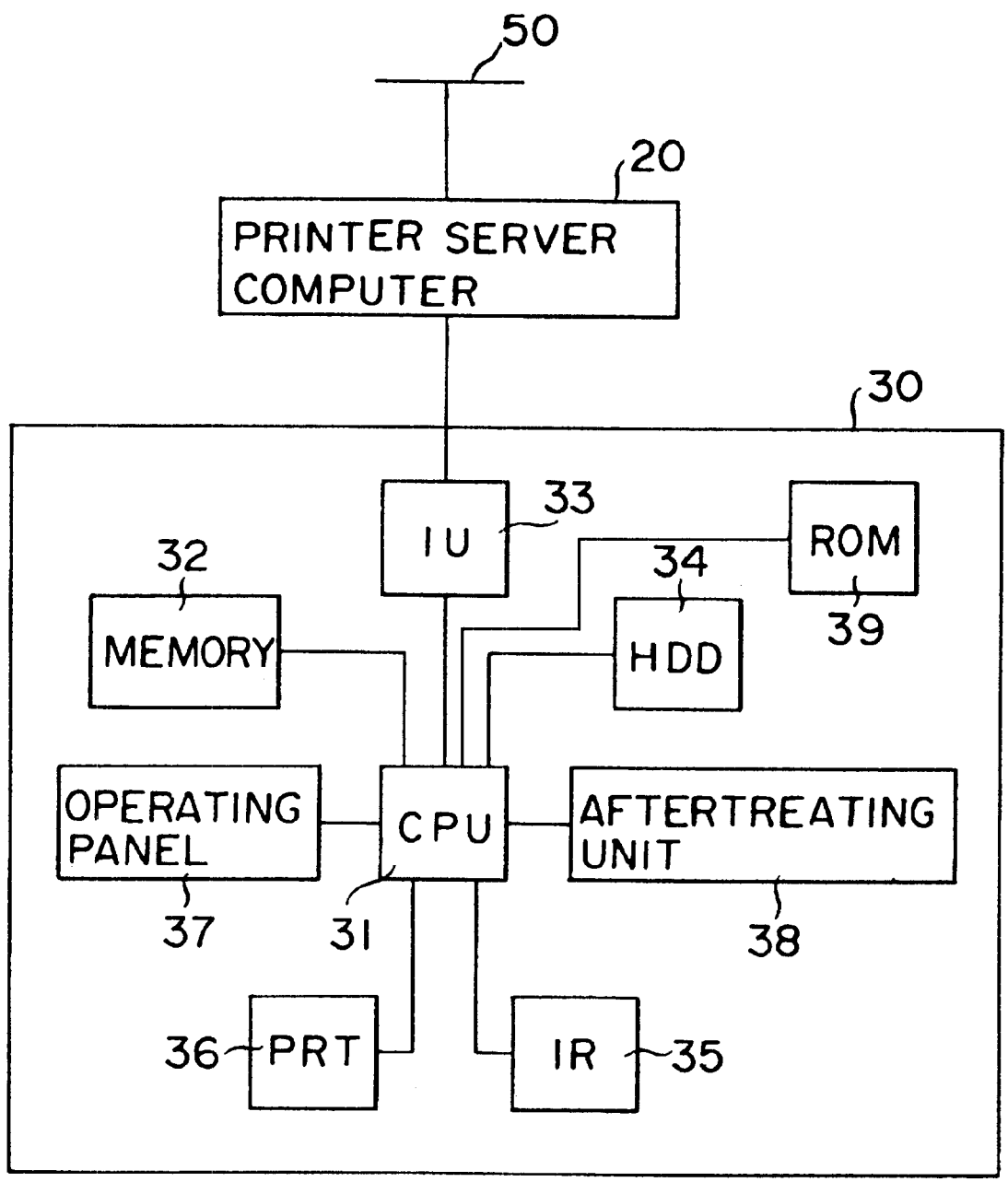
FIG. 2 is a block diagram of a digital copying machine used for said system.

In FIG. 2, the digital copying machine 30 comprises: an image reader unit (IR) 35 that reads document images; a printer unit (PRT) 36 that prints out images (print data) based on the electronic photography method; an aftertreatment unit 38 that sorts and staples the sheet of papers; a CPU 31 that controls these units and executes various image processes; a memory 32 that stores print data temporarily so that CPU 31 can execute these processes; ROM39 that stores programs for having CPU31 control various operation; and an interface unit (IU) 33 for exchanging data between an operating panel 37 and a printer server computer 20.

Said digital copying machine 30 also has a hard disk drive (HDD) 34. The hard disk drive 34 keeps programs necessary for image processing and the print out process. These programs are retrieved by the CPU 31 for conducting image processing and the print out process as necessary arises. The hard disk drive 34 stores read image data and print data from received other sources.

The primary function of said digital copying machine 30 is that of a copying machine. It is to store source document images read by the image reader unit 35 in the memory 32, and to output from the printer unit 36 a number of sets of prints specified through the operating panel 37.

The second function is that of a printer. It is to produce a number of sets of prints specified by the print mode data (to be described later) based on the print mode data and the print data being sent from the printer server computer 20.

The third function is that of a facsimile. It is to transmit images read by the image reader unit (IR) 35 through a telephone circuit (not shown) via a G3 facsimile unit connected to the telephone circuit, or to print out the received images by means of the printer unit 36.

The digital copying machine 30 is further provided with such image processing functions as the image enlarging and reducing function, the double-faced print function, and the Nin1 print function, all under the control of the CPU 31. The aftertreatment unit 38 is provided with a function for sorting printed sheets by each set, and a function for stapling them by each set.

The client computer 10 and the printer server computer 20 are computers such as those that are often called personal computers or UNIX system. Since these computers 10 and 20 are widely used and well-known kinds, detailed explanations are omitted here and only a description of a case where a personal computer is used as the client computer 10 will be given below.

Figure 3:
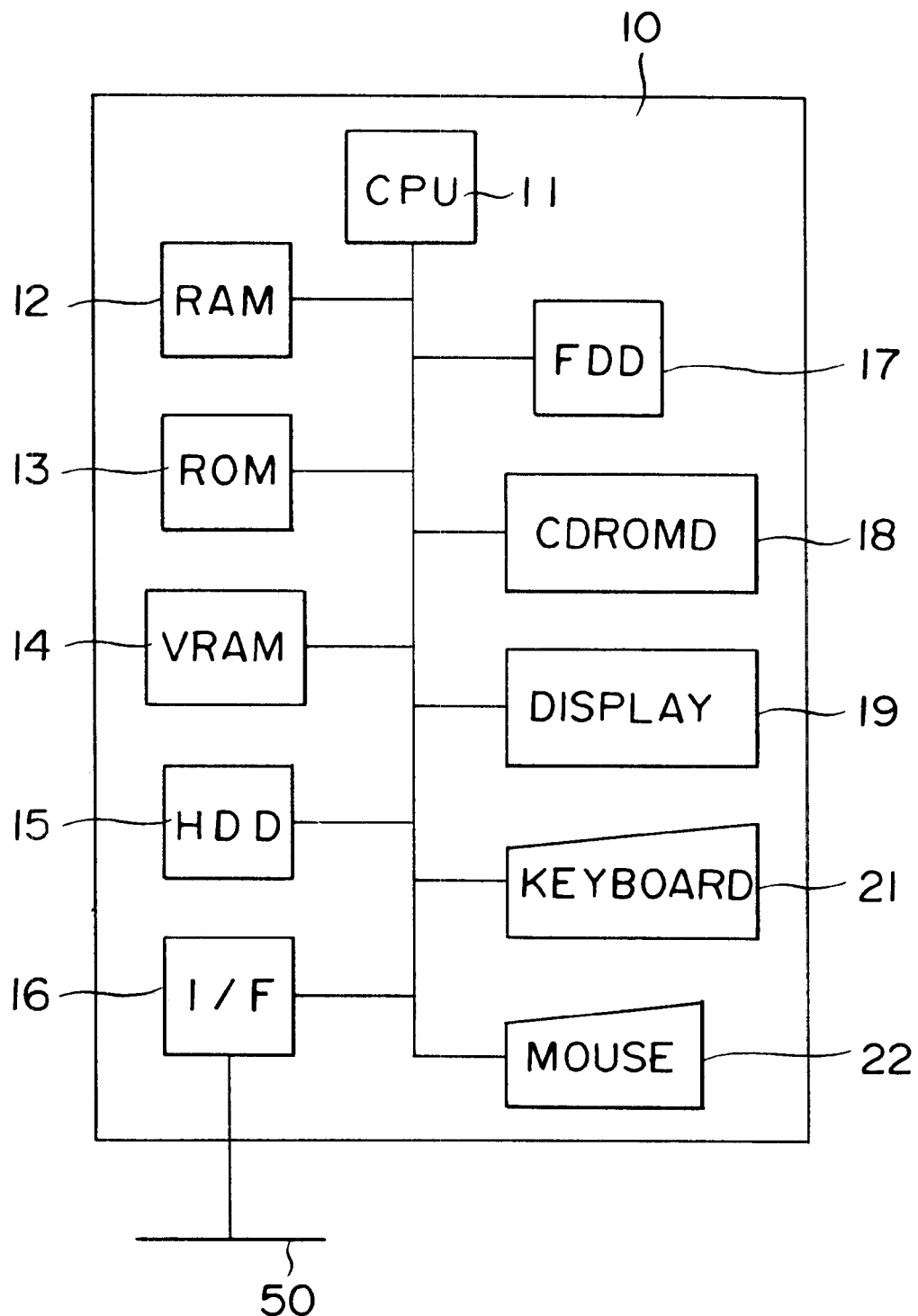
FIG. 3 is a block diagram of a client computer used for said system.

In FIG. 3, an ordinary personal computer comprises: a CPU 11 for executing processes; a RAM 12 used for expanding data or the like in the execution of programs; a ROM 13 for storing a boot system used for starting the personal computer; a VRAM 14 for expanding image data used to display images on the display 19; a hard disk drive (HDD) 15 for storing programs and various data; a display 19 for display various items; a keyboard 21 or mouse 22 for inputting characters and instructions; and an interface circuit (I/F) 16 for transmitting and receiving data to and from network 50.

This personal computer is also equipped with a floppy disk drive (FDD) 17 and a CD-ROM drive (CDROMD) 18 for read and write (read only in case of CD-ROM) data stored in floppy disks and CD-ROMs as memory media.

The difference in using a personal computer as the client computer 10 and as the printer server computer 20 lies in the actions generated as a result of execution of the application software on the computer; the only hardware differences between them are the process speed of the CPU, the memory capacity of the HDD, etc., the basic configuration being essentially the same. In some cases, the exactly identical computers are used for the two different purposes.

When the personal computer is used as the client computer 10, the network circuit 50 is the only thing that is connected to the interface circuit 16; however, if it is to be used as the printer server computer 20, an interface circuit is provided in addition to the network circuit to exchange data between it and the digital copying machine 30.

<Basic Print Sequence>

Figure 4:
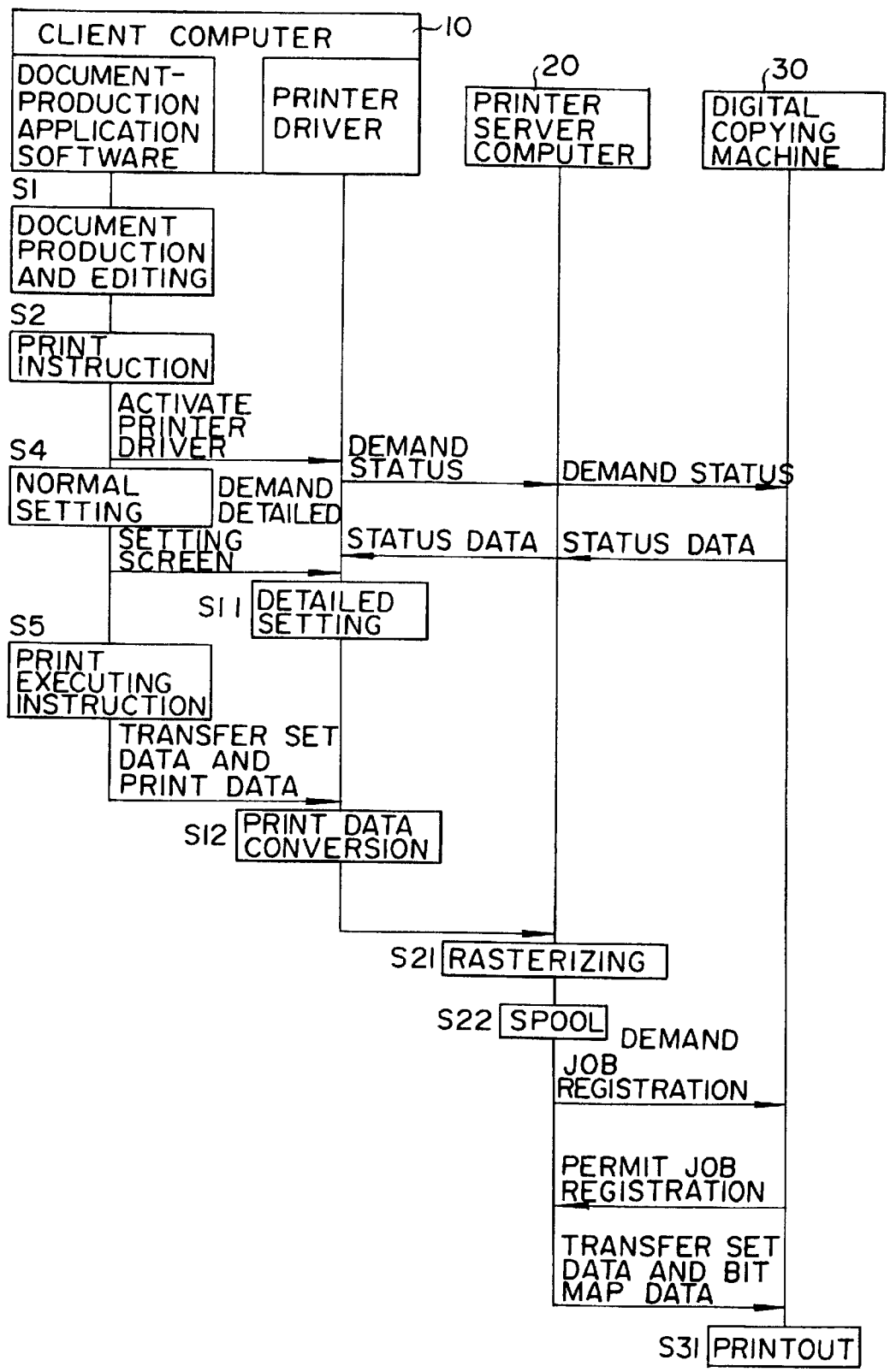
FIG. 4 is a diagram showing the basic print sequence in embodiment 1.

The following describes, referring to FIG. 4, the sequence from the time of the user's request for printing on the client computer 10 to actual printout by the digital copying machine 30.

In S1, the user produces and edits the target document using document production application software that operates on the client computer 10. The document production software is normally stored on the hard disk drive 15, loaded onto the RAM 12 when the user needs it, and is executed by the CPU 11.

The layout of the document and the print instruction data are displayed on the display 19, while the character input, image editing, print instruction, etc., are conducted via the keyboard 21 and the mouse 22, and these data are fed to the CPU 11 to be processed.

Once the document is produced and edited by means of the document production application software, a print instruction is entered (S2). When the print instruction is entered, a normal setting screen for the print mode will be displayed on the display. In the normal setting screen the number of sets to be printed is specified and whether printing is to be executed by each set is set (S4).

A printer driver is started by said print instruction (S2). The printer driver collects the mechanical status of the digital copying machine 30 and the registered job status through communication with the printer server computer 20.

The "mechanical status" includes, for example, standby, printing, and preheating, while the "job status" includes, for example, whether a job exists or not, the job is being printed, and the job is at the stand-by.

The printer server computer 20 communicates with the digital copying machine 30 based on the status request from the printer driver, collects each status of the digital copying machine 30, and feeds them to the client computer 10 adding the job status spooled on the RAM and the hard disk in the printer server computer 20.

The print mode setting for a normal print action is completed by setting it on the normal setting screen. If a unique function is to be set, a more detailed print mode must be set, so that the printer driver displays the detailed setting screen on the display 19 in response to a request by a user (S11).

The detailed setting screen is a screen, as shown in FIG. 5, comprising setting buttons and input frames for utilizing the functions that are unique to the digital copying machine, such as double-faced print, Nin1 print, sort, staple, and image size (enlarging or reducing).

This detailed setting screen provides a means of setting the number of sets of prints. Some of the document production application software allow the setup value for the number of sets of prints copies on the normal setting screen to be used only as the value for producing one job portion of print data in the particular document production application software and do not deliver the setup value of the number of sets of prints to the printer driver. Therefore, it is made possible to be set up again on the detailed setting screen, which is displayed by the printer driver.

As a result, when the number of sets of prints set up on the normal setup screen is to be fed to the printer driver as the print mode data, the number of sets of prints set up on the normal setup screen is displayed in the setup input frame for the number of sets of prints as shown in FIG. 5. If the number of sets of prints is not delivered to the printer driver, the number of sets of prints are entered here. It is preferable to display a prompt to urge the user to set up the number of sets of prints.

After the print mode is set, the instruction for print execution is provided by the user (S5 of FIG. 4). As a result, the document production application software delivers the document data as well as the print mode data set up by the normal setup screen to the printer driver. (However, a type of the document production application software cannot deliver any of the data set up by the normal set up screen to the printer driver.)

Thus, after the document data to be printed are arranged as the print data by the application software, and are delivered to the printer driver, the printer driver converts the received print data with the page description language (S12). The converted print data is transmitted to the printer server computer 20 and, after the rasterizing (S21) and spooling (S22) processes, is converted to bitmap data, and is outputted to the digital copying machine 30. Based on this print out data, the digital copying machine 30 executes printout (S31) following the instructions such as the number of print copies and aftertreatment.

<Output Sequence of Print Data by the Application Software>

The following is to describe the output sequence up to the point of outputting the print data to the printer server via the printer driver by means of the application software, which has a function of adding the information (set break code) that divides the print data by the set to the print data.

<Operation of the Application Software>

Figure 6:
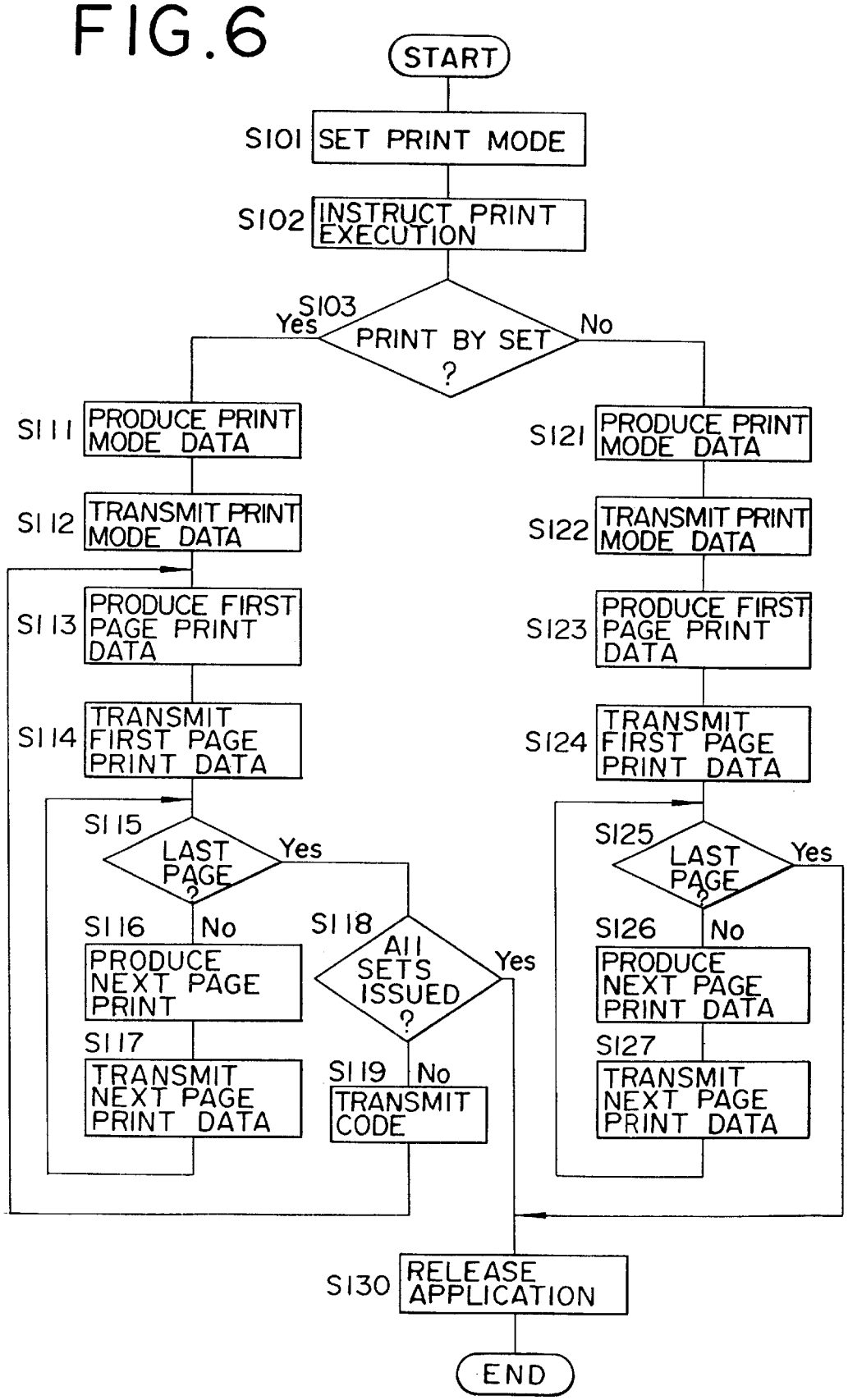
FIG. 6 is a flowchart showing the process sequence of application software to which the present invention is applied.

First, as shown in FIG. 6, the user sets the print mode when the normal setting screen is displayed (S101). The print mode setup simultaneously starts the printer driver as described before, and allows the user to set up the detailed setting screen as well.

Next, the user instructs the system to execute printing (S102). Whether the printing by the set was set on the normal set up screen is judged (S103). If printing by the set is set, the print mode data is prepared for the information specified on the normal setup screen to be transmitted to the printer driver (S111).

The print mode data's content includes the number of pages to be printed for each set, and the number of sets of prints specified to be printed. If a printer driver described later is used, such data as the number of pages per set and the number of sets of prints specified to be printed need not be entered.

Since the print mode that requires to be processed by the set according to the aforementioned special function is executed as specified on the detailed setting screen issued by the printer driver, it is not included in the print mode data that is being sent to the printer driver.

Said print mode data is sent to the printer driver (S112). If the document production application software does not transmit the print mode data to the printer driver, as described above, the steps S111 and S112 are not performed.

Next, the document data of the first page is prepared as the print data (S113) and transmitted to the printer driver (S114).

Whether the transmitted page is the last page for the set is judged (S115). If the transmitted page is not the last page, the print data for the next page is prepared (S116). The prepared print data is then outputted to the printer driver (S117).

If the transmitted page is found to be the last page for the set in the step S115, whether the output process of the data for the entire number of sets of prints set up on the normal setup screen has been completed is judged (S118). If the output of the entire sets have not been completed, the break code for set is transmitted (S119). The process then returns to the step S113. After that, the steps S113 through S119 are repeated and the application software is released when the output of all sets are completed (S130). This completes the output operation of the print data.

If it is determined at the step S103 that printing by the set was not set, the transmission process of the print data from the document production application software is conducted (S121–S127) as in the steps S111 through S117. However, if the data is judged to be that of the last page at the step S125, the document production application software is released (S130).

Thus, although the print data transmitted from the document production application software to the printer driver is the multiple sets of print data being transmitted as one job, it is added with the break code to indicate the set break for each set.

Therefore, if each set consists of three pages, i.e., 1, 2 and 3, of which three sets are to be produced, the print data outputted as one job shall be "1-2-3-break code-1-2-3-break code-1-2-3."

The application software, which contains a function to add the break code for each set, is provided by a memory medium, such as a floppy disk or CD-ROM, that can be read by the computer. This application software is then installed to be stored permanently on the hard disk of the client computer 10 and executed by the CPU 11.

<Operation of the Printer Driver>

Next, the process on the printer driver which received the print data containing the break for each set will be described.

Two different kinds of printer drivers that operate differently will be described here. The first printer driver is for a printer which receives print data for one set and the data about the number of sets to be printed so that it can process a job by the set. The second printer driver is for a printer that is capable of processing a job as a set.

The first printer driver will be described.

Figure 7:
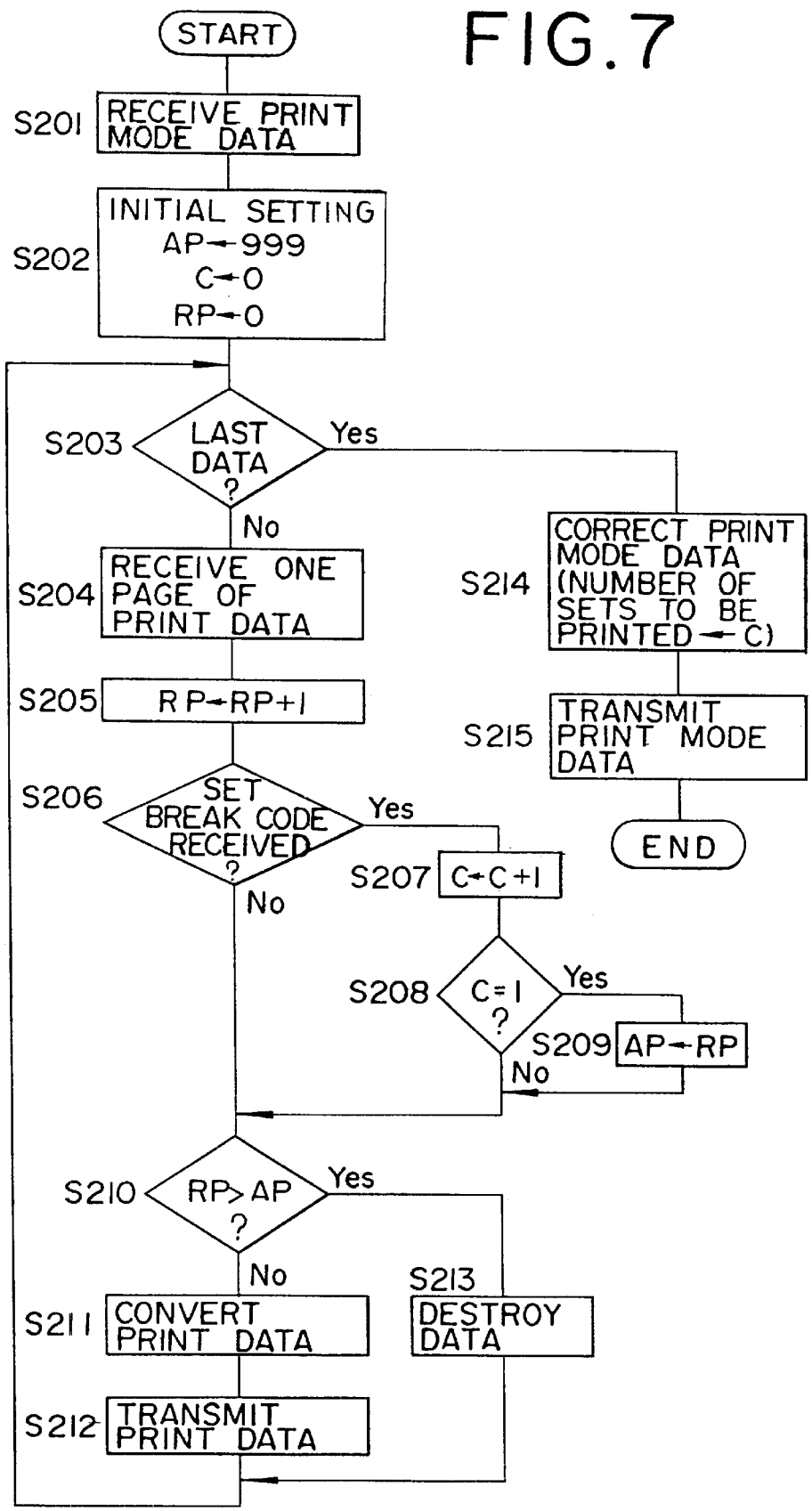
FIG. 7 is a flowchart showing a process sequence of a printer driver.

As shown in FIG. 7, the printer driver receives the print mode data transmitted from the document production application software (S201). The printer driver at this time reads also the setup entered on the detailed setting screen. In other words, the printer driver reads the setup of said special function that requires processing by the set.

Next, the initialization of variables required for processing is implemented (S202). At this time, a variable AP for counting the number of pages per set is set to 999, a variable C for counting the number of sets to be outputted is cleared to zero, and a variable RP for counting the received number of pages is cleared to zero. Further, when the printer driver receives the number of pages per set as the print mode data from the document production application software, it's value can be set, but now the variable AP is set to 999, which is a number that is larger than the maximum number of prints that can be produced.

The printer driver judges whether the received data is the last data in order to receive the print data from the document production application software (S203). If the received data is not the last data, it receives one page of print data (S204), and then adds 1 to the variable RP that counts the number of pages (S205).

The printer driver judges whether the set break code is received or not(S206). This judgment is a process for identifying the set break code embedded in the received print data. When the break code is received, the variable C for counting the number of sets is incremented by 1 (S207). Only when C is 1 (S208), the printer driver replaces the number of pages per set AP with the presently received number of pages RP (S209), and proceeds to the step S210.

When the set break code is not received at the step S206, the process proceeds to the step S210. The printer driver compares the received number of pages RP and the variable AP (S210), converts the received page data with the page description language (S211) if RP does not exceed AP, and transmits the converted print data to the printer server computer 20 (S212).

If RP exceeds AP at the step S210, the received page data is no longer the data of the first set (i.e., it is the data of the second or third set), so that it is destroyed (S213).

After completing each step, the process returns to the step S203, judged is whether the received page data is the last data, if it is the last data, the value of the variable C is accepted as the number of sets data, and this is combined with the setting of said special function to correct the print mode data (S214). The corrected print mode data is transmitted to the printer server computer 20 (S215).

Thus, the print data for one set, the number of sets to be printed, and the setting data for treating printed pages by the set as set up on the detailed setting screen according to said special function are outputted to the printer server computer 20 from the printer driver.

After receiving the print data, the printer server computer 20 conducts data analysis of the pint data in which one job comprises one set of prints, rasterizes it, and develops it into a bit map data which can be printed by the digital copying machine 30 acting as a printer (FIG. 4, S21).

However, if there is an instruction for Nin1 function, the computer performs only the per page rasterization, and a page composition for printing N pages of data on a single sheet of paper is executed by the Nin1 function of the digital copying machine 30. Also when there is an instruction for enlargement or reduction, only the per page rasterization is done so that the enlargement or reduction function of the digital copying machine 30 can be used.

The job finished with rasterization is spooled on the hard disk inside the printer server computer 20 (FIG. 4, S22). In this case, one job consisting of three pages only is spooled.

The spooled bit map data is transferred to the digital copying machine 30 together with the data about the number of sets to be printed and other function setup data. The digital copying machine 30 prints out a plurality of sets of prints based on the data about the number of sets and conducts the required process by the set based on the function setup data (FIG. 4, S31).

Next, the second printer driver will be described.

Figure 8:
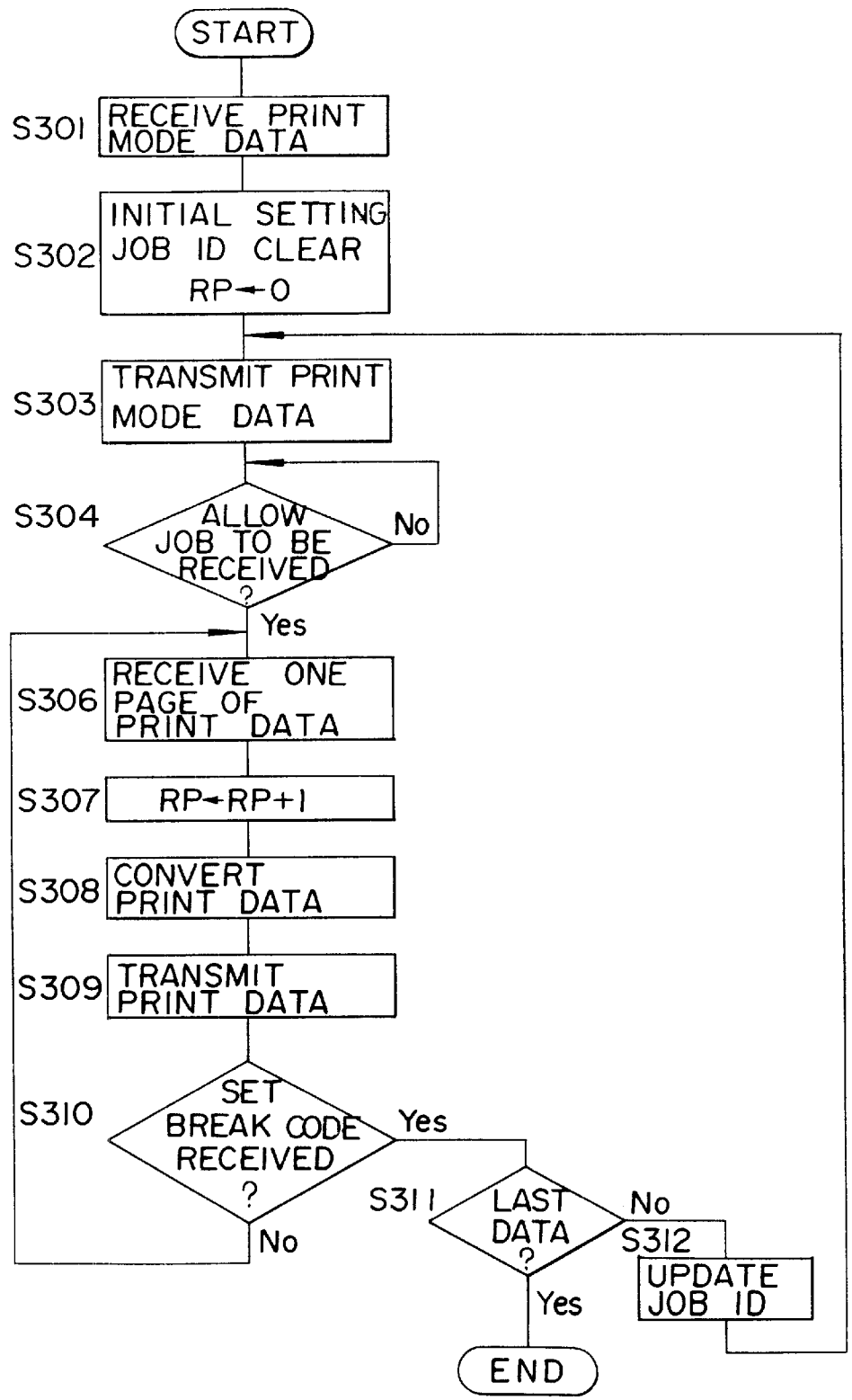
FIG. 8 is a flowchart showing a process sequence of another printer driver.

As shown in FIG. 8, the printer driver receives the print mode data transmitted from the document production application software (S301). The printer driver at this time reads the setup entered on the detailed setting screen. In other words, the printer driver reads the setup of said special function that requires processing by the set. This printer driver also does not need the number of pages per set and the number of sets to be printed as the print mode data from the document production application software.

Next, the initialization of variables that are required for processing is implemented (S302). At this time, since each set is recognized as a job, the job ID for making per job registration to the printer is cleared and the variable RP for counting the number of received pages is also cleared to zero.

Next, the printer driver outputs the print mode data to the printer server computer 20 (S303), and goes into a state for waiting allowance for receiving jobs (S304).

After it is allowed to receive the job, the printer driver receives one page portion of print data from the document production application software(S306). The printer driver adds 1 to the variable RP that counts the number of pages (S307), and converts the received page data with the page description language (S308). The converted print data is transmitted to the printer server computer 20 (S309).

The printer driver judges whether the set break code is received or not(S310). This judgment is to identify the break code embedded in the received print data. If the printer driver has not received the set break code, the process returns to the step S306 and repeats the steps S306 through S310 until the set break code is received.

When the printer driver receives the set break code, it judges whether the final data has been received (S311), update the job ID if it is not the final data (S312), and returns to the step S303 to receive the next set.

When the received data is judged to be the final data at the step S311, the process is terminated.

Thus, the print data is divided into each set which comprises one job, and each job is outputted together with the print mode data from the printer driver. Therefore, the printer can execute processing by the set for each job. For example, if the instruction is to print data consisting of three pages, i.e., 1, 2, and 3, three times, a set of 1-2-3 pages is treated as a job and the job is outputted three times.

The printer server computer 20 receives the print data divided into jobs, analyzes the print data per job, rasterize it, and develops it into a bit map data so that the digital copying machine 30 acting as a printer can print it (FIG. 4, S21).

However, if there is an instruction for Nin1 function, the computer performs only the per page rasterization, and a page composition for printing N pages of data on a single sheet of paper is executed by the Nin1 function of the digital copying machine 30. Also when there is an instruction for enlargement or reduction, only the per page rasterization is done so that the enlargement or reduction function of the digital copying machine 30 can be used.

Each job, i.e., each set in this case, is spooled on the hard disk of the printer server computer 20 after rasterization (FIG. 4, S22). The digital copying machine 30 prints the spooled bit map data for each job and executes necessary treatment by the set based on the specified function setup data (FIG. 4, S31).

The first and second printer drivers are both provided by a memory medium such as a floppy disk and CD-ROM readable by a computer. These first and second printer drivers are then installed to be stored permanently on the hard disk of the client computer 10 and, when a print instruction is received, read into RAM 12 to be executed by the CPU 11.

<Output Sequence of Print Data by Printer Driver>

The operation sequence of the printer driver from adding the set break data to the print data up to outputting it to the printer server will be described.

In this case, the print data outputted from the application software is outputted as one job consisting of multiple sets, and the print data has not breaks between sets, so that, when the printer driver described here receives the print data without set breaks, it adds the set break codes based on the data of the number of sets and the number of pages per set.

<Operation of Printer Drivers>

Figure 9:
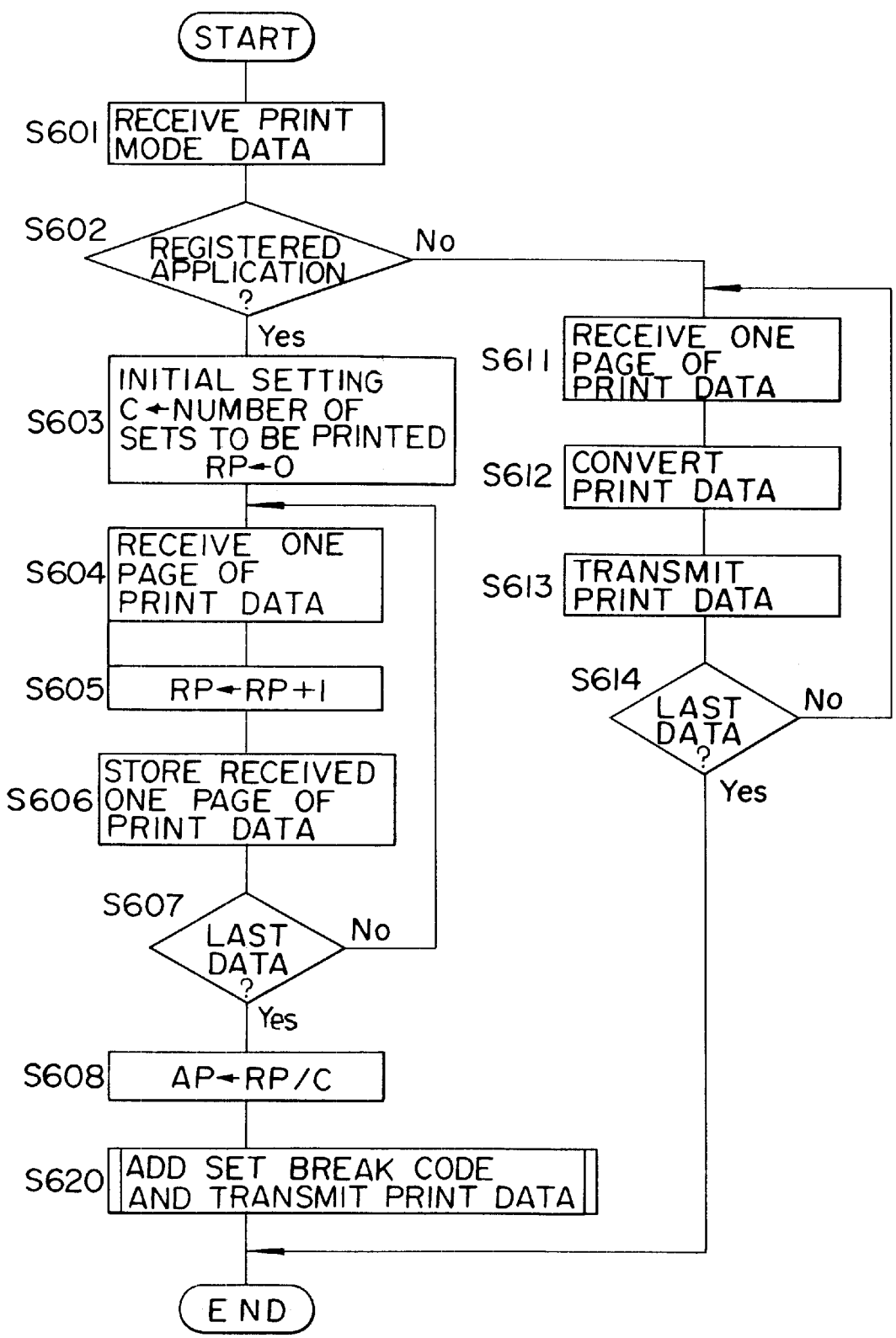
FIG. 9 is a flowchart showing a process sequence of yet another printer driver.

The printer driver, as shown in FIG. 9, receives the print mode data from the application software (S601). When the number of sets is outputted by the application software, the printer driver receives it. If the number of sets is not outputted, the printer driver displays the detailed setting screen (FIG. 5) on the display and prompts the user to input the number of sets.

The printer driver judges whether the application software that outputted the print mode data is a preregistered application software (S602). What is meant here as a preregistered application software is an application software that outputs the print data having no set breaks even in the case of printing multiple sets, treating the multiple sets as one job. This application software is registered including its name and the version number, if applicable. One such example is Word 97 by Microsoft®. The software is registered including its name, i.e., Word 97, and its version number.

If the application software that outputted the print mode data at the step S602 is not a preregistered application software, there is no need to add the set break code, so that the printer driver receives one page portion of the print data (S611), converts it with the page description language (S612), and transmits it to the printer server (S613). Next, it judges whether the received data is the final data (S614). The steps S611 to S614 are repeated until the final data is received and transmitted.

If the application software that outputted the print mode data at the step S602 is a preregistered application software, in other words, if it is an application software that combines multiple sets into one job and transmits it with no set break, the printer driver receives the print data and adds the set break code for each set to the received print data by means of the processes through steps S603 through S608 and S620.

The process starts with entering the value of the number of sets into the variable C that represents the number of sets in the initial setting, and clears the variable RP showing the number of pages received to zero (S603). If the number of set data is included in the received print mode data, it is entered into C; if it is not included there, is entered the number of sets entered from the detailed setting screen is entered into C.

The printer driver receives one page portion of the data (S604), adds 1 to RP for counting the number of pages received (S605), and stores the number of pages received (S606).

The printer driver judges whether the received page is the final data (S607). If the received page is not the final data, the processes of the steps S603 through S607 are repeated until the final data is received.

After receiving the final data, the number of pages per set, AP, is obtained (S608). In this example AP is obtained by dividing the number of pages received, RP, with the variable C, which represents the number of sets.

When the above processes are completed, the process proceeds to adding of the set break code and the print data transmission (S620).

In the adding of the set break code and the print data transmission the stored print data is transmitted converting with the page description language while the break code is transmitted (added) for each set break.

Figure 10:
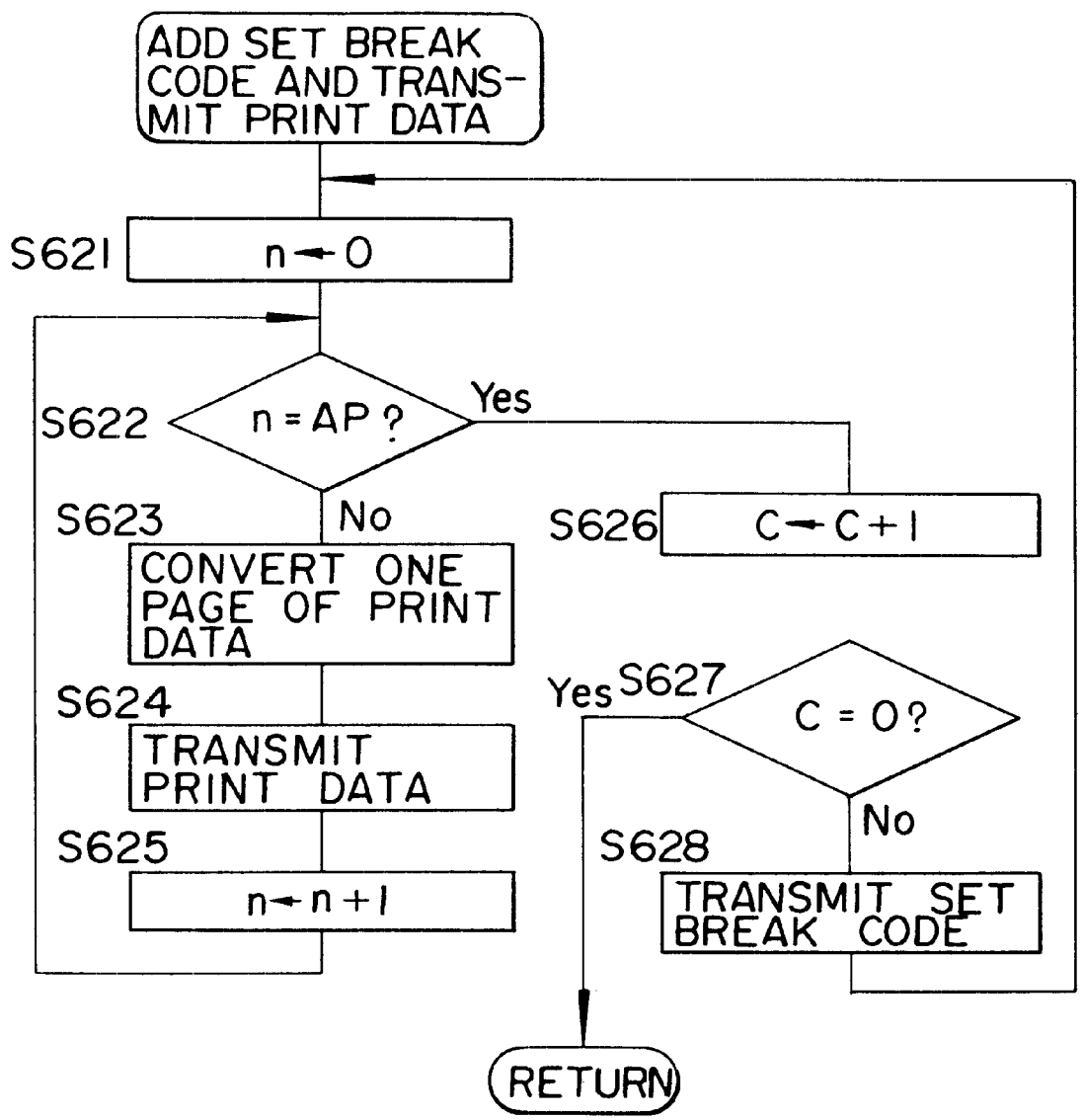
FIG. 10 is a subroutine flowchart showing a process sequence for adding set break codes and transmitting print data shown in FIG. 9.

According to this process, as shown in FIG. 10, the variable "n" for counting the number of pages being transmitted is cleared to zero (S621), and whether n=AP or not is judged comparing the n value and the number of pages per set, AP (S622).

If n=AP is not satisfied, the printer driver reads the stored print data from the first page one at a time, converts one page portion of the print data with the page description language (S623), and transmits the converted print data (S624).

The printer driver adds 1 to n (S625), and returns to the step S622. The transmission of one set of print data is executed by executing each process of the steps S622 through S625 until n=AP is satisfied.

When n=AP is satisfied at the step S622, it means that the transmission of one set of print data is completed, so that the variable C, which represents the number of sets, is reduced by 1 (S626). The printer driver judges whether the variable C is zero at this point (S627).

If C=0 is not satisfied, it transmits the set break code (S628), and returns to the step S621 in order to transmit the print data for the next set. If C=0 is satisfied at the step S627, it means that the print data for all the required sets have been transmitted, so that the process returns to the original routine to end the process.

Such are the processes of the printer driver, which outputs to the printer server the print data that is outputted from the application software as one job consisting of multiple sets but with no breaks, while adding set break codes to the data.

While the number of set data is used in order to judge a set of print data in the above example, the same judgment can also be done using the data of the number of pages per set, or by detecting whether the identical data page exists in the print data, assuming that there is a set break in front of the identical page.

<Operation of the Printer>

The two styles of printer operations applicable when a printer receives print data added with the break code for each set as describe above are described now.

The first printer converts the print data, wherein multiple sets are treated as one job, into one set of print data and the number of set data, based on the set break code, to execute printing by the set.

The second printer executes printing by the set each time when it receives the set break code.

These printer operations are performed in the hardware configuration of the digital copying machine 30 shown in FIG. 2 as the CPU 31 executes the program (stored in the memory or HDD) prepared according to each operation sequence as described later.

<Operation of the First Printer>

Figure 11:
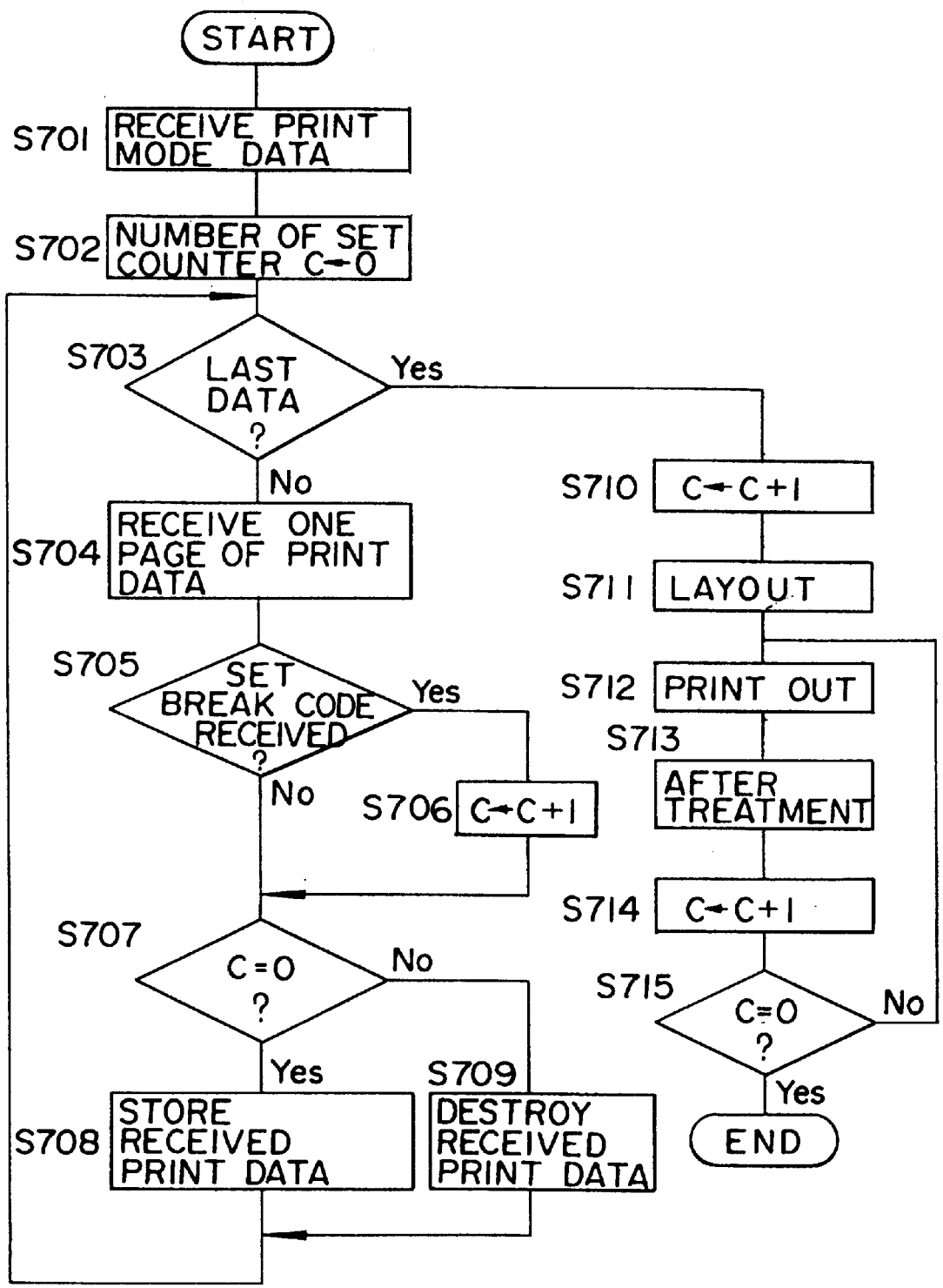
FIG. 11 is a flowchart showing a process sequence of a printer.

As shown in FIG. 11, the first printer receives the print mode data (S701). The print mode data received here contains, for example, the instruction for said special function as a process to be executed by the printer. The printer clears the variable C for counting the number of sets to zero (S702), and judges whether the received data is the final data (S703). If the received data is not the final data, it receives one page portion of print data (S704).

The printer judges whether the set break code has been received (S705). This judgment is the process of identifying set break codes embedded in the print data. When the set break code is received, it adds 1 to the variable C for counting the number of sets (S706), and the process proceeds to the step S707. If the set break code is not received, the process proceeds to the step S707.

The printer judges whether the variable C is zero (S707), and stores the received print data when C=0, i.e., if the first set data is being received (S708). The process returns to the step S703 and continues on receiving and storing of the next page data. If it judges that C=0 is not satisfied, i.e., the variable C is 1 or larger when the set break code is received at the step S705, it destroys the print data of the received page (S709). This is due to the fact that the print data received after the receipt of the break code is identical to the print data stored already as the first set, thus making the print data of the second set or later unnecessary.

If the final data is received at the step S703, it adds 1 to the variable C for counting the number of sets (S710). The printer reads each stored page and does the page layout so that it can be printed on the specified paper (S711). This layout process lays out the page in such a way that N pages portion of the data can be printed on a single sheet of paper if there is a Nin1 print instruction.

If the stored print data consists of an odd number of pages, for example, if one set consists of three pages while 2in1 instruction exists, it does the page layout in such a way that the last page data read out will be printed on one half space of a single sheet and the rest of the page be left blank.

The same thing occurs in the case of 4in1, in other words, the layout will be such that a part of the last page will be left blank. This layout process is executed to all of the stored print data (print data for one set) and will be stored as a layout data.

The printer then prints out all the data on sheets according to this layout (S712). After the entire pages of a set are printed in such a manner, the printer executes the aftertreatments such as sorting and stapling as specified (S713).

The printer reduces the variable C by 1 (S714), judges whether C=0 (S715), and returns to the step S712 if it is not zero, and prints out the data of the next set according to the layout formed in the step S711. The cycle is repeated until C becomes zero to print all the rest of the sets.

Consequently, the first printer performs the printing by the set by counting the number of sets by means of the set break code, storing one set of print data only, and repeating the process of printing one set of print data the number of times required.

<Operation of the Second Printer>

Figure 12:
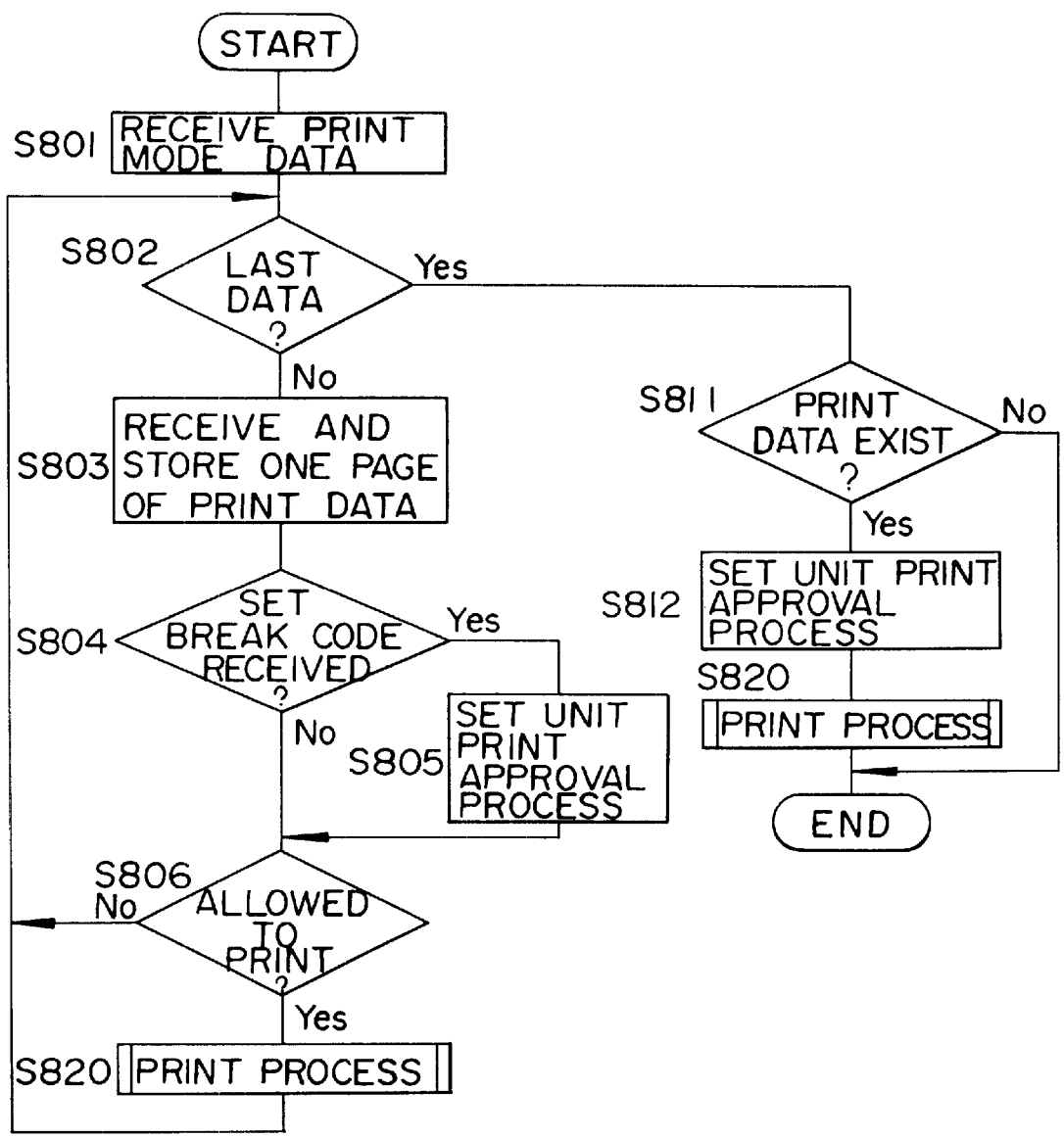
FIG. 12 is a flowchart showing a process sequence of another printer.

The second printer receives the print mode data as shown in FIG. 12 (S801). The received print mode data is similar to that of the first printer and includes the instruction for said special function. The second printer judges whether the received data is the final data (S802). If it is not the final data, the printer receives one page portion of the print data and stores it (S803).

The second printer judges whether the set break code is received (S804). The judgment is the process of identifying the set break code embedded in the print data. If the set break code is received, the approval process for printing by the set is executed (S805), and proceeds to the step S806. If the set break code is not received, the process proceeds to the step S806.

The printer then judges whether the print approval has been issued (S806), and executes the print process to be described later if printing has been approved (S820). If printing has not been approved, the process returns to the step S802 to receive and store the next page data, and repeats the steps 802 through 806 until printing is approved. These steps S802 through 806 as well as the step S820, the printer continues to receive the print data until the set break code is received and stores it. When the set break code is received, the stored print data is printed out.

Consequently, this printer judges the end of a set of print data by the set break code, and executes printing of the set.

Figure 13:
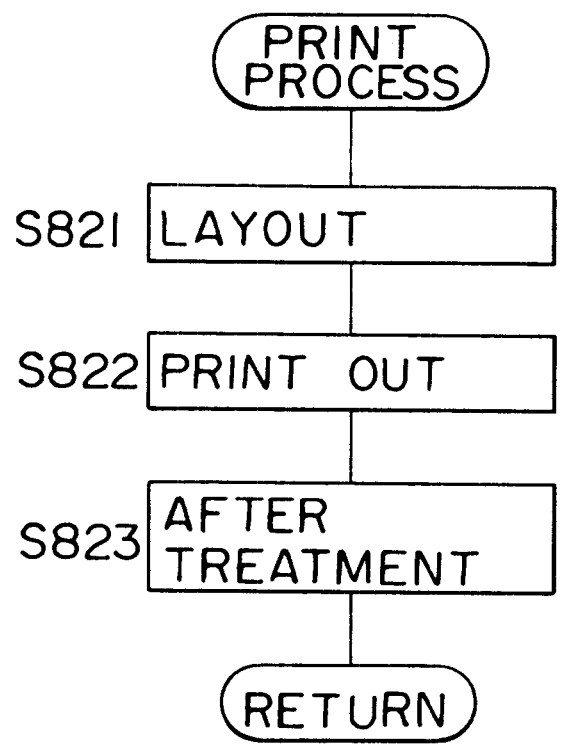
FIG. 13 is a subroutine flowchart showing the sequence of the print process shown in FIG. 12.

In the printing process (S820), the printer reads out the stored print data per page as shown in FIG. 13 and conducts the layout process (S821). In this layout process, the printer conducts the Nin1 and the double-faced printing layouts for the entire pages.

In the printing process, the printer prints out the entire pages according to the page layouts made in the previous step (S822), and conducts the specified aftertreatment after the printout process is completed (S823).

Return to FIG. 12, when it is judged that the final data is received in the previous step S802, the printer judges whether the stored print data still exists in order to complete printing for the final set (S811), and terminates the process if there is no stored print data. However, if there still remains some print data, the printer issues a print approval (S812), and executes the print process (S820).

Thus, the printout by the set is executed each time the set break code is received and the process is conducted one set at a time.

The present invention is not limited to the embodiment described above. In said embodiment, the application software and the printer driver are used as the means of adding set break code, the printer driver is used as the means of identifying the set break code to allow the printer to conduct the processing by the set, and the printer is used as the means of identifying the set break code and executing the processing by the set as explained above.

However, in the present invention, it is also possible to use a printer server computer that performs the same processes as in each of the aforementioned examples as a means of adding the set break code. Also, it is also possible to provide a printer with a means of adding the set break code per set to the print data received. Furthermore, it is also possible to use, a printer server computer, or a dedicated control device for controlling the printer as a means of identifying the set break code and processing by the set.

<<Embodiment 2>>

The second embodiment of the present invention is intended to provide a means of executing the process by the set on the printer appropriately by configuring the printer server computer to divide the print data, in which multiple sets are outputted as a job, into multiple sections thus allowing it to output print data, in which each set is treated as one job.

Figure 14:
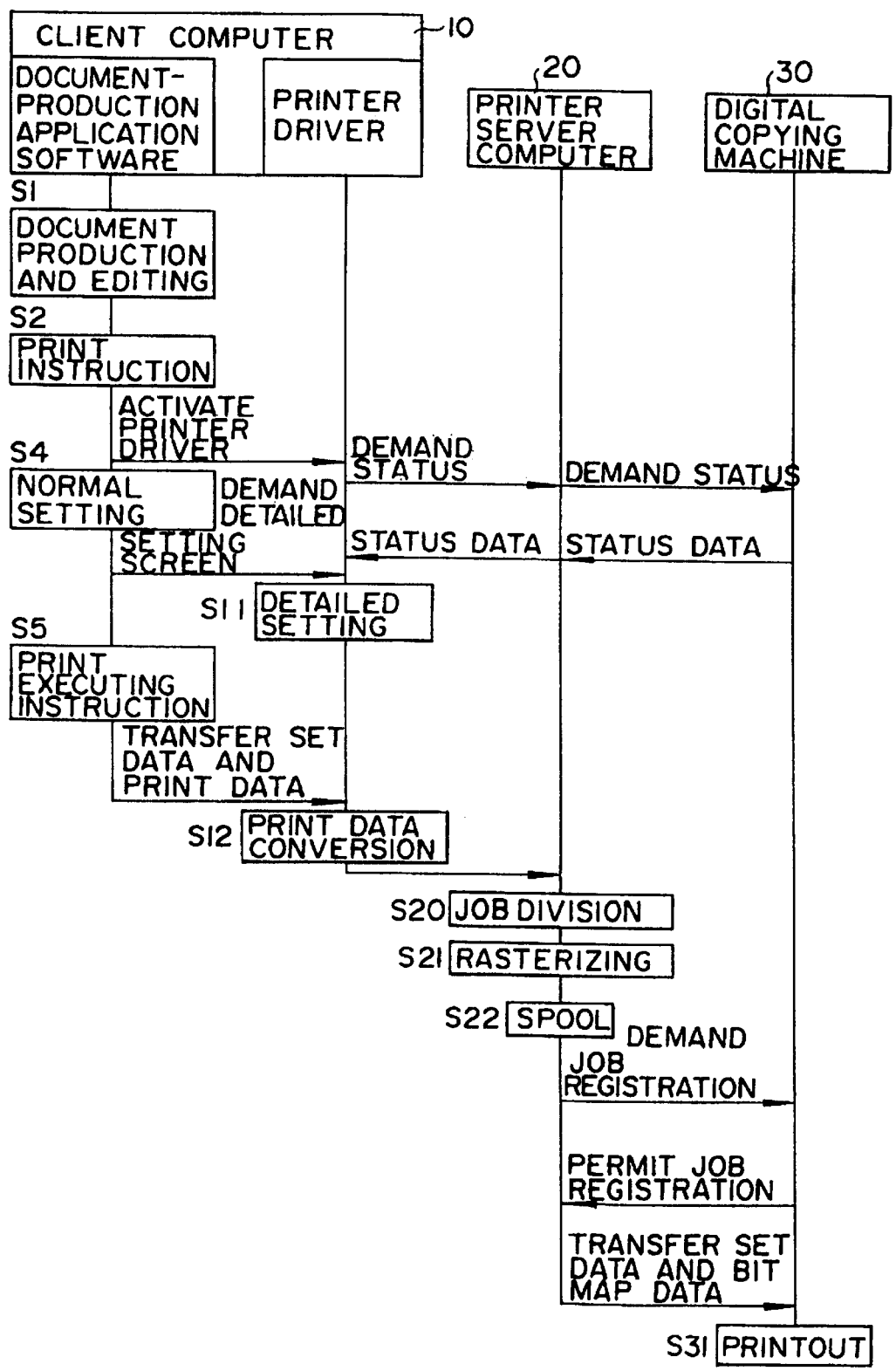
FIG. 14 is a diagram showing the basic print sequence in embodiment 2.

Therefore, as shown in FIG. 14, the basic print sequence in the second Embodiment converts the print data with the page description language (S12), and divides the job in printer server computer (S20).

Since the hardware configuration and the other steps of this embodiment are similar to that of the first embodiment, so that the description of the identical parts area omitted and only the job division process will be described.

This corresponds to the difference in the printer function. The first dividing process is the process for a printer where the printer that receives a job and conducts the process by the job. The second dividing process is the process for a printer that is capable of receiving one set of print data and the number of sets to be printed to perform processing by the set.

<First Processing Format>

Figure 15:
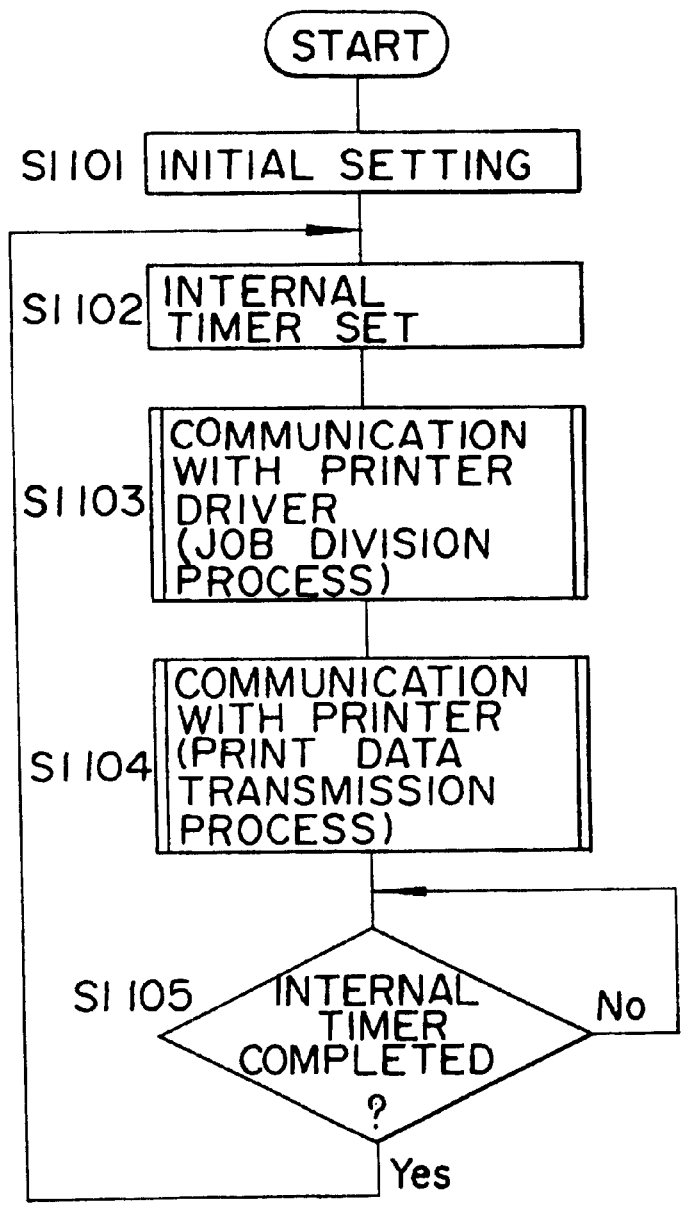
FIG. 15 is the main flowchart showing a printer server computer.

As shown in FIG. 15, the printer server computer 20 is first initialized (S1101). The initialization, for example, includes clearing of variables required for processing. Next, the internal timer is set (S1102).

The printer server computer 20 then communicates with the printer driver (S1103) to execute the job dividing process, which will be described later. Next, it communicates with the printer (S1104). This communication sends the divided print data one set at a time as one job to the printer.

Upon completing the execution of all the processes, the printer server computer 20 returns to the step S1102 when the set time expires on the internal timer (S1105) to repeat the steps again.

Figure 16:
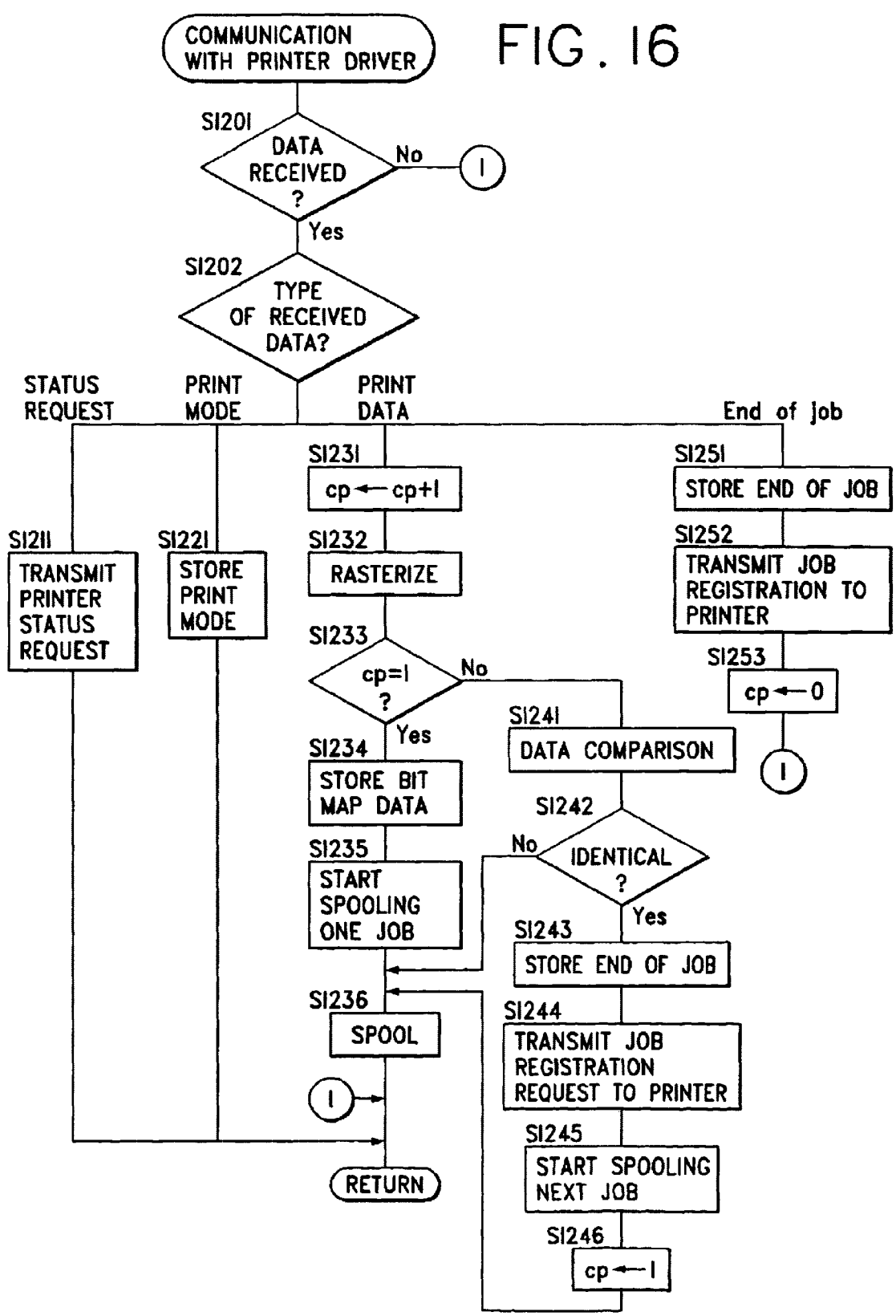
FIG. 16 is a subroutine flowchart showing a process sequence of communication with the printer driver shown in FIG. 6.

The printer server computer 20 is maintained at a print instruction wait condition if there is no data exchange with the printer driver and the printer, the communication process with the printer driver, as shown in FIG. 16, first judges whether it has received any data from the printer driver (S1201).

When the data is received, the printer server computer 20 judges the type of received data (S1202). If the received data is a status request, the request is transmitted to the printer as is (S1211). The process returns to the main flow chart and the process of communication with the printer is implemented.

Figure 18:
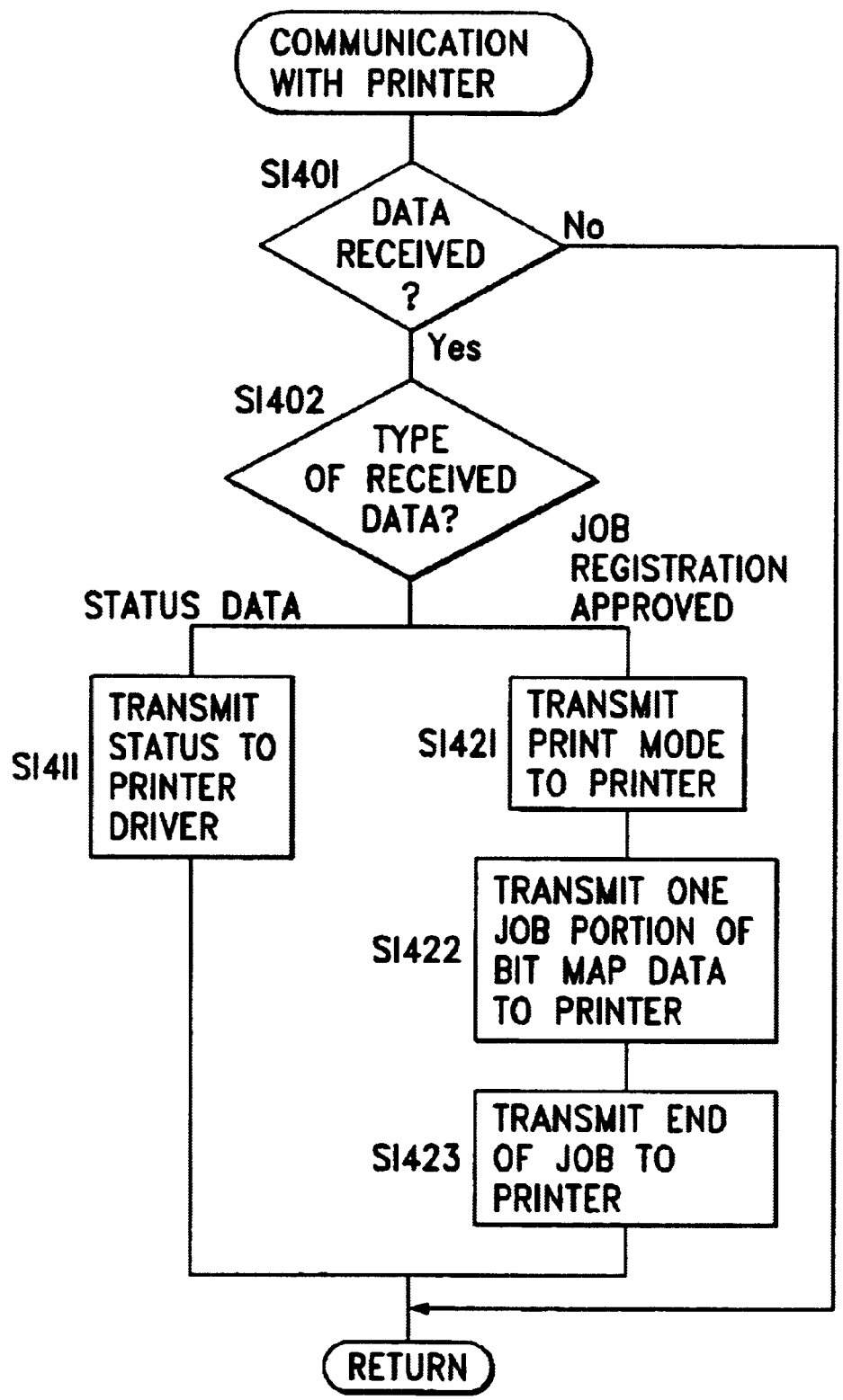
FIG. 18 is a subroutine flowchart showing the process sequence of communication with the printer driver shown in FIG. 6.

In the communication process with the printer, as shown in FIG. 18, it judges whether it has received any data from the printer (S1401), and then judges the type of the received data (S1402). In response to said status request (S1211), when the printer returns the status data, data consisting of said status data plus the job accumulation status in the printer server computer 20 is sent to the printer driver in response (S1411).

The communication with the printer driver is conducted in such a way that, if the received data is the print mode data, it is stored (S1221); if the received data is the print data converted with the page description language, the variable cp for counting the received pages is incremented by 1 (S1231). Since this variable cp is cleared to zero when all data have been received, cp is set to 1 when the first page data is received due to this step S1231.

The printer server computer 20 rasterizes the received page (S1232), and stores the one page portion of the rasterized bit map data into the memory if cp is 1 (S1234).

After the start of the spooling of one job portion of the data is recorded (S1235), the rasterized page is spooled (S1236). The data to be stored in the memory will be the first page data since it is occurred that the variable CP is 1 only when the data received from the printer driver is the first page data. If the variable cp is not 1, the data stored on the memory and the received print data (data after rasterization) are compared (S1241).

Figure 17:
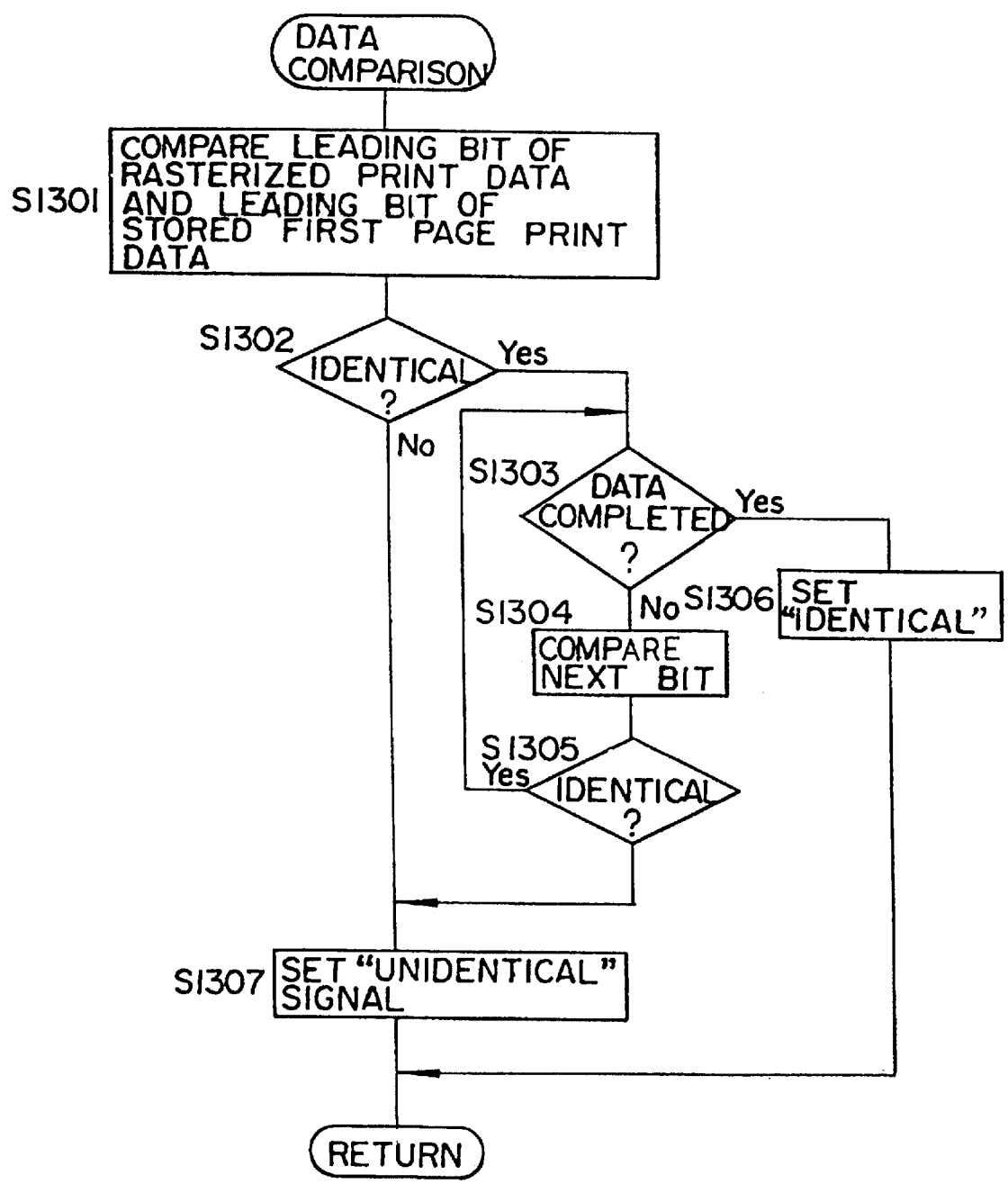
FIG. 17 is a subroutine flowchart showing the sequence of data comparison process shown in FIG. 7.

As shown in FIG. 17, the comparative processing of this data starts with comparing the first bit of the print data after rasterization and the first bit of the first page print data stored in the memory (S1301). If they are identical, it further judges if the compared data is the final data (S1303). If it is not the final data, it goes on to compare the next bits (S1304).

If the result of the comparison is the same, it returns to the step S1303 and repeats the steps S1303 through S1305 until the data no longer match. At the point where the result of the comparison shows a mismatch in the middle of the process, an signal to show that they are unidentical is set (S1307). If the two data are judged to be identical to the end, a signal to show that they are identical is issued (S1306).

This process makes it clear whether each of the pages starting with the second page received from the printer driver is identical to the first page.

If, in the data comparison process of the previous step S1241, the data is found to be different from the one stored (S1242), the data after rasterization is spooled (S1236); if it is judged to be identical (S1242), a command, "End of Job," is stored to denote the end of a job, and the spooled data is closed as one job of data (S1243). The printer server computer 20 then sends the registration request of the job to the printer in order to have said one job of data printed out (S1244).

The comparison process of the data at the step S1241, when the print data of the first page stored in the memory is identical to that of the received page, consists of determining a certain page of the print data that is identical to the first page is indeed the first page of the next set among a continuing multiple sets of print data. Therefore, the printer server computer 20 judges the break point of the set by comparing the print data of the first page and the print data of each page that follows.

Following the job registration request at said step S1244, the computer registers the start of the next job spooling (S1245), and sets the variable cp for the page count to 1 (S1246). The receiving data (the data judged to be identical to that of the first page stored at the step S1242) is then spooled (S1236).

The printer server computer 20 divides the print data received as one job containing multiple sets into separate jobs, each job corresponding to a set, by repeating the processes S1231 through S1246 until an "End of Job" command is received from the printer driver.

When an "End of Job" command is received from the printer driver, it is stored (S1251) in order to close the data that has been spooled as the last job, transmits a job registration request to the printer (S1252) in order to print out the last job, and clears the variable cp to zero in order to execute the next print (S1253).

In communication with the printer (FIG. 18), if a data showing that registeration is approval is received in regard to the registration request for each divided job, the print mode stored at the step S1221 is transmitted to the printer (S1421), and the spooled data equivalent to one job is transmitted to the printer (S1422). After transmitting the print data equivalent to one job, an "End of Job" command is transmitted (S1423) to notify the printer the end of a job. The processes of the steps S1421 through S1423 are executed each time a registration approval signal is received from the printer regarding the job registration request at the step S1244 or S1252.

Consequently, since the print data divided by the printer server computer 20 is transmitted to the printer in such a way as each set being configured as a job, the printer executes the process by the set properly by conducting the process required for each job (such as sorting).

<Second Processing Format>

Since the second processing format by the printer server computer 20 has a main flow chart identical to that of FIG. 15 described in the above, the description will not be repeated here except the processes of communication with the printer driver and with the printer.

Figure 19:
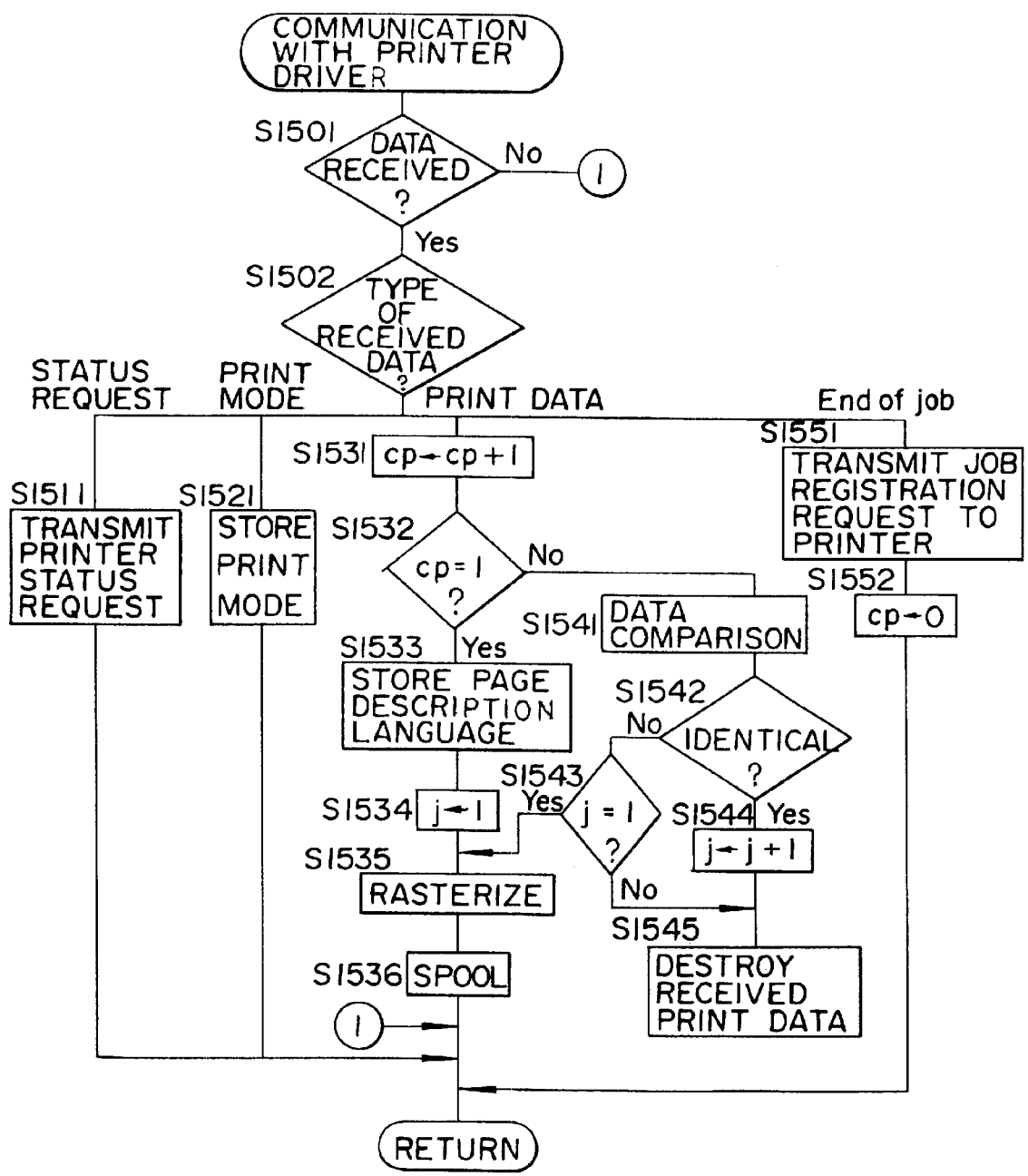
FIG. 19 is a subroutine flowchart shown another form of process sequence for communication with the printer shown in FIG. 6.

The printer server computer 20 is in a waiting state for the data from the printer driver, and the communication process with the printer driver, as shown in FIG. 19, begins with determining whether it has received any data from the printer driver (S1501).

When it receives the data, it judges the type of the received data (S1502). If the received data is a status request, the request is transferred to the printer as is (S1511). The process returns to the main flow chart, and the process of communication with the printer is conducted.

Figure 20:
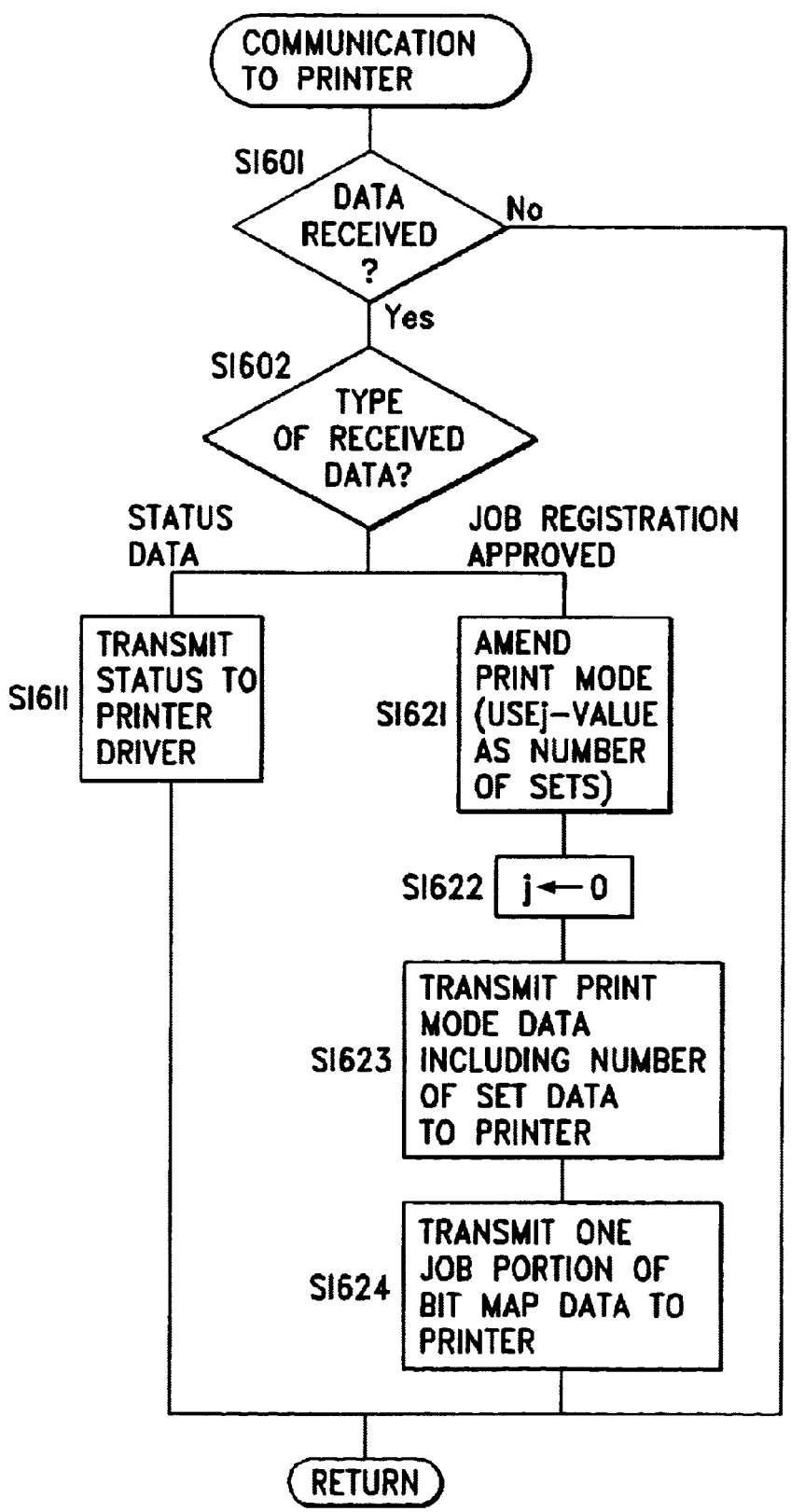
FIG. 20 is a subroutine flowchart showing another form of process sequence for communication with the printer shown in FIG. 6.

The communication process with the printer, as shown in FIG. 20, it judges whether it has received any data from the printer (S1601), and judges the type of the received data (S1602). When the printer returns the status data in response to the aforementioned status request (S1511), data consisting of said status data plus the job accumulation status in the printer server computer 20 is sent to the printer driver in response (S1611).

The communication with the printer driver is conducted in such a way that, if the received data is the print mode data, it is stored (S1521); if the received data is the print data converted with the page description language, the variable cp for counting the received pages is incremented by 1

(S1531). Since this variable cp is cleared to zero when all data have been received, cp is set to 1 when the first page data is received.

It then judges whether the value of the variable cp is 1 (S1532). If cp is 1, it stores the received one page portion of the data in the page description language into the memory (S1533) and enters 1 into the variable j for counting the number of sets (S1534).

The printer server computer 20 rasterizes the received page (S1535), and spools it (S1536). The data to be stored in the memory will be the first page data since it is occurred that the variable CP is only when the data received from the printer driver is the first page data, similar to the aforementioned case.

If the variable cp is not 1, the data stored in the memory and the received data are compared (S1541). The data comparison here is different from the aforementioned case of FIG. 17, the data in the page description language are compared as they are. As a result, if the two data are judged to be identical, the following data can be destroyed without having to go through rasterizing and spooling.

This means that only one set of the data needs to be rasterized and spooled, resulting in the minimization of the processing time for rasterization and the hard disk usage for spooling particularly when a large number of sets has to be printed.

If it is judged at the step S1541 that the two data are identical (S1542), the variable j for counting the number of sets is incremented by 1 (S1544), and the received data is destroyed (S1545).

If it is judged at the step S1541 that the two data are not identical (S1542), it is then judged whether the received page data is the data of the first set among the multiple sets (S1543). If the variable j is 1, i.e., "the data of the first set," the received data in the page description language is rasterized (S1535), and spooled (S1536). If the variable j is other than 1 (the received data is the data of the second or later set), the received data is destroyed at that point (S1545).

By repeating the steps S1531 through S1545 until an "End of Job" command is received from the printer driver, the printer server computer 20 spools only one set of the print data received as one job containing multiple sets, and stored the number of sets to be printed as the value of the variable j.

When it receives an "End of Job" command, it sends a job registration request to the printer (S1551), and clears the variable cp to zero for the execution of the next print (S1552).

As shown in FIG. 20, when the printer server computer 20 receives a data indicating that registration is approval from the printer in relation to the job registration request, it performs a corrective action of adding the value of said variable j as the set number data to the print mode stored at the step S1521 (S1621), clears the variable j to zero (S1622), and transmits the corrected print mode to the printer (S1623). Next, it transmits one job portion of the spooled data to the printer (S1624).

Thus, only one set of the print data and the number of set data are transmitted to the printer from the printer server computer 20. The printer stores one set of print data temporarily, prints out this one set of data repeatedly as many as the required number of sets, and makes necessary treatment (sorting, etc.) by the set to complete the processing by the set properly.

The program for conducting the processing using the above-mentioned printer server computer 20 is provided on the computer readable memory media such as a CD-ROM or floppy disk and is installed to store permanently in the hard disk to be executed by the CPU 11.

The choice between the above-mentioned two processing formats depends on the printer connected to the printer server computer. For example, if there is only one kind of printer that requires either of the two processing formats (including a case where the computer is connected to multiple printers having a function based on the same processing format), only one program of the required processing format needs to be executed. If printers of different processing formats are connected to the computer, it is possible to execute appropriate one of the aforementioned programs of two processing formats as need depending on the printer currently.

The present invention should not be construed to be implemented only with the printer server computer, but rather it can be configured with a printer driver within the client computer or other utility software. When a computer is used as a stand-alone unit connecting a printer directly to the computer, it is preferably configured with a printer driver or other utility software.

<<Embodiment 3>>

The present invention is not only to be used as a program executable on a computer but also as a program to be executed by the control device of a printer. Two kinds of printers with different processing formats will be described. The first printer prints out the received print data by sequentially dividing it by the set, while the second printer stores only one set of the received print data and prints it out as many sets as required. The hardware construction is identical to the first embodiment, so that the description is omitted.

<First Printer>

The first printer receives the bit map data as the print data after rasterization, prints out the received print data by the page sequentially, conducting the double-faced print and the Nin1 print, compare the first page and the second or later pages from the received print data, identify the break code for set, and execute the processing by the set. The received print data is a data of a job comprising multiple sets without any breaks between the sets.

Figure 21:
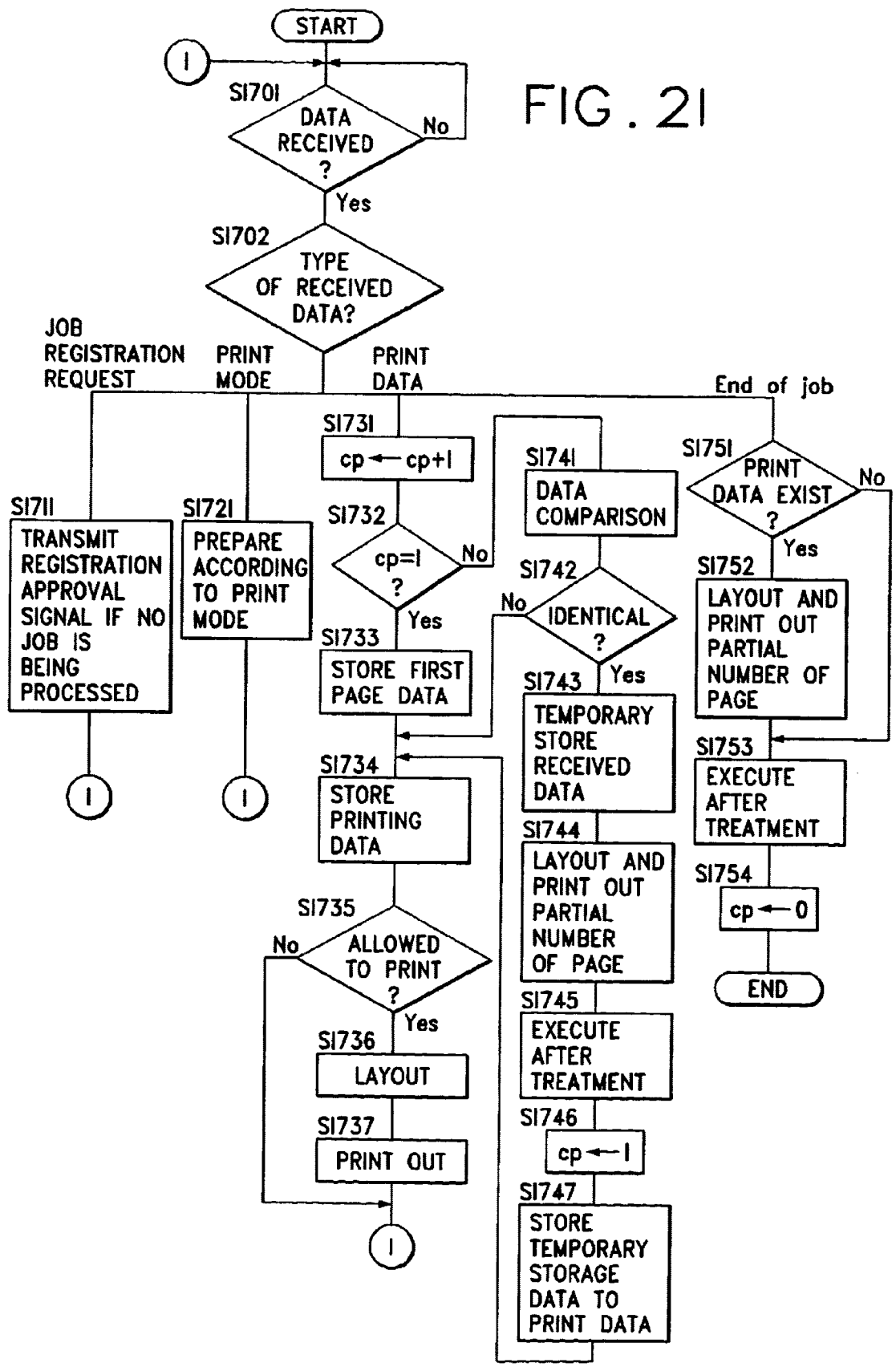
FIG. 21 is a flowchart showing a process sequence of a printer according to the present invention.

As shown in FIG. 21, when it receives a data (S1701), it judges the type of the received data (S1702).

When the received data is the job registration request, and if there is no job being executed, it issues the registration approval signal in response to the request (S1711).

When the received data is the print mode data, it analyzes it, and prepares to conduct the action it is instructed (S1721).

When the print data is received, the variable cp for counting the received pages is incremented by 1 (S1731). Since the variable cp is cleared to zero after all the data have been received as described later, it sets cp=1 when the first print data is received.

Next, it judges whether the value of the variable cp is 1 or not (S1732), it stores one page portion of the bit map data into the memory (S1733). The variable cp is 1 only when the received print data is the first page 1, and the data stored into the memory is the page 1 data of the first set. The process now proceeds to the step S1734 to conduct various processes for printing.

The printer stores the received page as the data for printing (S1734) and then makes a judgment about whether the printing is possible or not (S1735). This judgment is whether necessary data has been accumulated to print one sheet of paper in the double-faced print or the Nin1 print.

For example, since the double-faced print is to print two pages of images on the front and back sides of a sheet of paper, it judges whether two pages portion of the data are accumulated as the print data at the step S1734.

Since the 2in1 print is to print two pages of data on one side of a sheet of paper, it judges whether two pages of data are stored.

If both the double-faced print and the 2in1 print are specified, two pages of data are printed on one side of a sheet of paper and both sides are to be printed, it judges whether four pages of data are stored in total.

If it is to print out one page of data on a single sheet of paper, the judgment at the step S1735 naturally allows to start printing at the point when the print data for one page of printing is stored, i.e., as soon as one page of print data is received.

If the judgment at the step S1735 allows printing, it reads the page stored as the print data, conducts the layout process according to the instruction such as the double-faced print or the Nin1 print (S1736), and prints it out (S1737). If there is an instruction such as the alternative printing (printing images on sheets of paper alternating the vertical direction upside down), it changes the orientation of the image during the layout.

If the judgment at the step S1735 cannot print, it returns to the step S1701 while keeping the data for printing and receives the next data.

When the variable cp is not 1 at the step S1732, it compares the data stored in the memory and the received data (S1741). In other words, the process at the step S1741 is to judge the break code for set by comparing the stored first page data and the data of the second or later pages received.

The processing of these data comparison is the same as the case of FIG. 17, a judgment is made by comparing the two print data starting with the leading bit.

If it is judged that they are not the same print data (S1742), the process proceeds to the step S1734, and conducts various processes for printing as described before.

On the other hand, if it is judged that they are the same print data (S1742), it stores the received page data temporarily for saving to conduct the processes by the set (S1743). The printer then reads out the data that has been stored due to the fact that the number of pages collected is insufficient for printing on a single sheet of paper for the double-faced or the Nin1 print ("fractional data") from the data for printing, does the page layout, and prints it out (S1744).

Therefore, if one page of data was left as the fractional data as a result of the process at the step S1744, for example, in case of the double-faced print, this data will be printed on one face only. Similarly, when there is an instruction for the 2in1 print and one page of data has been left as the fractional data, the image of one page data will be printed on a space representing one half of one side of a sheet of paper. If there is no fractional data stored, no layout or print out process will be conducted.

If there is an instruction for aftertreatment (sorting, etc.), the printer conducts aftertreatment (S1745), set the variable cp to 1 (S1746). The printer then re-store the print data, in other words, reestablish the received page which has been saved, i.e., the first page data for the next sets as the data for printing (S1747), and proceeds to the processes of the step S1734 and later. This causes the printing of the next set to be continued.

From that point on, the printer repeats the steps S1731 through S1747 until the "End of Job" command is received, prints the print data being received as a job containing multiple sets, printing in the order of pages received, identify the break code for set, and conducts necessary processes by the set.

When the printer receives the "End of Job" command, and judges whether there are any print mode data for the sake of processing the final set (S1751). If there are some print mode data, in other words, fractional data remains, the printer does the page layout, prints it out (S1752), and executes any aftertreatments (sorting, etc., specified by the special function mentioned before), if they are specified (S1753). It then sets cp to zero to accommodate for the next printing operation (S1754), and completes the entire process.

According to the process, the first printer can properly execute the process by the set, even if the print mode data consists of one job which contains multiple sets without the break code for set, by dividing them by the set.

<Second Printer>

The second printer receives a print data (bit map data) consisting of one job with multiple sets having no the break code for set, stores one set of the print data temporarily, counts the number of sets to be printed, and prints out the data according to the number of sets to execute the process by the sets.

Figure 22:
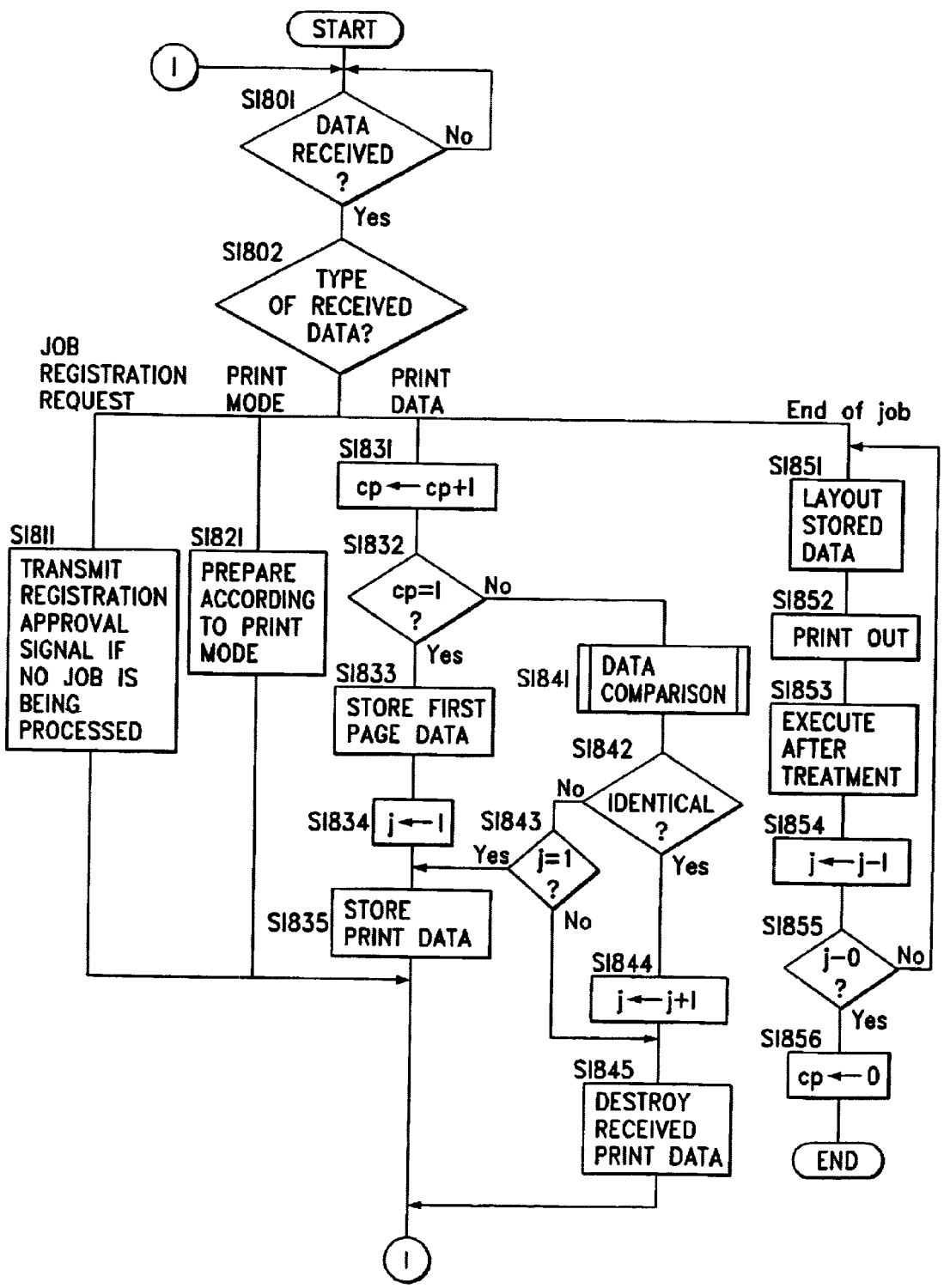
FIG. 22 is a flowchart showing another form of process sequence of a printer according to the present invention.

As shown in FIG. 22, when the second printer in the data wait state receives the data (S1801), it judges the type of the received data (S1802).

If the received data is a job registration request, it returns the registration approval signal in response to the request if there is no job being executed (S1811).

If the received data is a print mode data, the printer analyses it and conducts preparation for the specified action (S1821).

When it receives the print data, the printer adds 1 to the variable cp for counting the received number of pages (S1831). Since this variable cp is cleared to zero after all the data has been received as described later, the variable cp is 1 when the first page is received.

The printer judges whether the variable cp is 1 or not (S1832), and stores one page portion of the received bit map data to the memory if the cp is 1 (S1833), and set the variable j for counting the number of sets to 1 (S1834). The variable cp is 1 only when the received print data is that of the first page 1, and the data to be stored in the memory is the page 1 data of the first set. The received page data is stored in the memory (or the hard disk) as the data for printing (S1835).

If the variable cp is not 1, the printer compares the data stored in the memory and the received data (S1841). This comparison process is the same as the case shown in FIG. 17, and it is to judge whether they are identical print data by means of comparing them starting with their leading bits one by one. This enables it to determine the break code for set.

If the printer determines that those print data are identical (S1842), it adds 1 to the variable j for counting the number of sets (S1844), and destroys the received data (S1845).

If it determines that they are not identical (S1842), it judges whether the received page is a data of the first set among the multiple sets depending on whether the variable j for counting the number of sets is 1 or not (S1843). If the variable j is 1, in other words, the received data is that of the first set, the received bit map data is stored as the data for printing (S1835). If the variable j is not 1, in other words, the received data is that of the second or third set, the received data is destroyed immediately (S1845).

Consequently, the data for printing to be stored in the memory (or the hard disk) will be one set of bit map data even if multiple sets are to be printed, so that the memory (or the hard disk) usage can be reduced.

Thereafter, the printer repeats the processes of the steps S1831 through S1845 until the "End of Job" command is received from the printer driver, stores the print data received as a job containing multiple sets as one set of print data and stores the number of sets to be printed out as the variable j.

When the printer receives the "End of Job" command, reads one set of stored data for printing, conducts the image layout for a sheet of paper if the double-faced or Nin1 printing is specified (S1851), and prints it out (S1852).

At this time, if an alternative discharge (for example, the first set is discharged vertically and the second set is discharge transversely) is specified in order to identify the sets discharged, the printer conducts a process, such as, to change the orientation of the image.

After the completion of one set of print out, the printer conducts the aftertreatment (S1853) if there are any specified aftertreatment (sorting etc.), and reduces the variable j representing the number of sets by 1 (S1854).

The printer repeats the steps S1851 through S1855 until the j value becomes zero (S1855) to complete processing of the entire number of sets, and clears the variable cp to zero (S1856) for the next printing process to end the entire process.

Thus the printer can divide the data by the set, even if the print data is received as one job consisting of multiple sets, and execute the process by the set properly.

The processing of the received print data by the printer is handled by the CPU in the printer, as it executes the specified programs according to the above-mentioned processing sequence.

Therefore, the ROM in the printer control device is the memory media of the present invention, and the CPU in the printer and the memory and the hard disk that stores the program and data required by the CPU for said processing function as the data receiving means, the comparison means and the section dividing judgment means for the present invention.

More specifically, for example, the digital copying machine 30 with the printer function stores the program for applying the present invention in the ROM 34 or the hard disk 35 where the programs for control are stored, and the CPU 31 reads them out to execute them.

In the second and third embodiments, while the printer stores one page portion of the first page print data and compares with the print data of the second and later pages, it does not only to store the entire one page portion of the print data, but also it can be adapted to store only the required portion of it to perform the intended function. When it constructs like this, the time for comparison will be reduced so that the volume of comparison data be reduced.

Conversely, the original data for comparison can be stored the multiple pages. In this case, it judges that there is the break code for set when pages identical to the stored multiple pages are found.

However, the stored pages to be used as the base of the comparison must include the first page. This is to identify the first page of the next set when multiple pages are compared and judged to be identical, and the page that has the same data as the stored first page data is identified as the first page of the next set, also judging that there is a set break in front of said page. This is possible to prevent mistakenly judging the break code for set even if a page with the same data as that of the fist page happened to be included in one set.

If multiple pages are used as the base data of comparison, it is possible to print out continuously without stopping for the break code for set until all pages are identified identical to the entire stored pages.

Moreover, in the second and third embodiments, while the first page print data is compared with the print data of the rest of the pages sequentially as the print data are being received, it can also be configured to store the entire multiple sets of data first and then compare the first page (or multiple pages containing the first page) with the rest of the pages.

The computer system where the present invention can be applied is not limited to the net work computer system of the style mentioned above. For example, the present invention can be applied to a format where a stand-alone personal computer is directly connected with a high performance printer as an application software or a printer drive of the computer. The present invention can be applied to a printer directly connected to the stand-alone personal computer.

The various processes described in the above-mentioned embodiments are conducted as the client computer, printer server computer or control device in the printer reads out and executes the programs provided by a floppy disk or CD-ROM or other memory media.

What is claimed is:

1. A print data processing apparatus comprising:
   a means of receiving print data in which one job comprises one set of print data repeated multiple times;
   a means of identifying data that indicate set break and are added to the received print data; and
   a means of destroying said print data leaving only one set of print data and obtain a number of sets contained in said job based on said data identified by said identifying means.

2. A computer program product stored on memory media for processing print data executable by a computer comprising:
   a means of receiving print data in which one job comprises one set of print data repeated multiple times;
   a means of storing first page data of the received print data;
   a means of comparing a second or later page data of said print data with said stored first page data; and
   a means of judging that, when the second or later page data and said stored first page data are identical, a set break exists before said second or later page data.

3. A computer program product as claimed in claim 2, further comprising a means of dividing said print data by the set based on the set break of said judgment and outputting the divided print data.

4. A computer program product as claimed in claim 2, further comprising a means of destroying said print data leaving only one set of print data and obtaining a number of sets contained in said job based on said set break of said judgment.

5. A print data processing apparatus comprising:
   a means of receiving print data in which one job comprises one set of print data repeated multiple times;
   a means of storing first page data of the received print data;
   a means of comparing the second or later page data of said print data with said stored first page data; and
   a means of judging that, when the second or later page data and said first page data are identical, a set break exists before the page corresponding to said second or later page data.

6. A print data processing apparatus as claimed in claim 5, further comprising a means of dividing said print data by the set based on said set break of said judgment and outputting the divided print data.

7. A print data processing apparatus as claimed in claim 5; further comprising:
   a means of destroying said print data leaving only one set of print data and obtaining a number of sets contained in said job based on said set break of said judgment.

8. A method of processing print data comprising the steps of:
- a) receiving print data in which one job comprises one set of print data repeated multiple times;
- b) storing first page data of the received print data;
- c) comparing a second or later page data of said print data with said stored first page data; and
- d) judging that, when the second or later page data and said stored first page data are identical, a set break exists before said second or later page data.

9. A method as claimed in claim 8, further comprising a step of dividing said print data by the set based on the set break of said judging in said step d) and outputting the divided print data.

10. A method as claimed in claim 8, further comprising a step of destroying said print data leaving only one set of print data and obtaining a number of sets contained in said job based on said set break of said judging in step d).

* * * * *